United States Patent
Oshitani et al.

(10) Patent No.: US 7,178,359 B2
(45) Date of Patent: Feb. 20, 2007

(54) EJECTOR CYCLE HAVING MULTIPLE EVAPORATORS

(75) Inventors: Hiroshi Oshitani, Toyota (JP); Yasushi Yamanaka, Nakashima-gun (JP); Hirotsugu Takeuchi, Nagoya (JP); Katsuya Kusano, Obu (JP); Makoto Ikegami, Anjo (JP); Yasukazu Aikawa, Nagoya (JP)

(73) Assignee: Denso Corporation, Kariya (JP)

( * ) Notice: Subject to any disclaimer, the term of this patent is extended or adjusted under 35 U.S.C. 154(b) by 163 days.

(21) Appl. No.: 11/055,795

(22) Filed: Feb. 9, 2005

(65) Prior Publication Data
US 2005/0178150 A1 Aug. 18, 2005

(30) Foreign Application Priority Data

| | | | |
|---|---|---|---|
| Feb. 18, 2004 | (JP) | | 2004-041163 |
| Mar. 16, 2004 | (JP) | | 2004-074892 |
| Mar. 24, 2004 | (JP) | | 2004-087066 |
| Oct. 1, 2004 | (JP) | | 2004-290120 |

(51) Int. Cl.
F25B 1/06 (2006.01)
(52) U.S. Cl. ........................................ 62/500
(58) Field of Classification Search ............ 62/86, 62/170, 191, 471, 500, 527, 528; 417/151, 417/168
See application file for complete search history.

(56) References Cited

U.S. PATENT DOCUMENTS

| | | | |
|---|---|---|---|
| 3,701,264 A | 10/1972 | Newton | |
| 5,343,711 A * | 9/1994 | Kornhauser et al. | 62/116 |
| 6,477,857 B2 * | 11/2002 | Takeuchi et al. | 62/500 |
| 6,574,987 B2 | 6/2003 | Takeuchi et al. | |
| 6,606,873 B2 * | 8/2003 | Takeuchi | 62/191 |
| 6,675,609 B2 * | 1/2004 | Takeuchi et al. | 62/500 |
| 6,729,149 B2 * | 5/2004 | Takeuchi | 62/191 |
| 6,782,713 B2 * | 8/2004 | Takeuchi et al. | 62/500 |
| 6,871,506 B2 * | 3/2005 | Takeuchi et al. | 62/170 |
| 6,877,339 B2 * | 4/2005 | Nishijima et al. | 62/500 |
| 6,904,769 B2 * | 6/2005 | Ogata et al. | 62/500 |
| 6,918,266 B2 * | 7/2005 | Ikegami et al. | 62/500 |
| 6,966,199 B2 * | 11/2005 | Takeuchi | 62/500 |
| 2004/0007014 A1 | 1/2004 | Takeuchi et al. | |
| 2004/0206490 A1 | 10/2004 | Katoh et al. | |
| 2005/0268644 A1 | 12/2005 | Oshitani et al. | |

FOREIGN PATENT DOCUMENTS

| | | |
|---|---|---|
| EP | 0 487 002 | 2/1997 |
| JP | 59-172966 | 11/1984 |
| JP | 63-26830 | 5/1988 |
| JP | 04-316962 | 11/1992 |
| JP | 5-312421 A * | 11/1993 |
| JP | 06-018121 | 1/1994 |
| JP | 06-137695 | 5/1994 |
| JP | 2004-044851 | 2/2004 |
| JP | 2004-257694 | 9/2004 |

* cited by examiner

Primary Examiner—Mohammad M. Ali
(74) Attorney, Agent, or Firm—Harness, Dickey & Pierce, PLC

(57) ABSTRACT

A first evaporator evaporates refrigerant, which is outputted from an ejector. A refrigerant outlet of the first evaporator is connected to a suction inlet of a compressor, which is connected to a radiator. A branched passage branches a flow of the refrigerant at a corresponding branching point located between the radiator and the ejector. The branched passage conducts the branched flow of the refrigerant to a suction inlet of the ejector. A flow rate control valve is arranged in the branched passage between a radiator and an ejector on a downstream side of the radiator to depressurize refrigerant outputted from the radiator. A second evaporator is arranged in the first branched passage.

34 Claims, 15 Drawing Sheets

| OPERATING MODE | | | |
|---|---|---|---|
| | FIRST EVAPO. | SECOND EVAPO. | MULTIPLE EVAPO. |
| FIRST SOLENOID VALVE | OPEN | CLOSE | OPEN |
| SECOND SOLENOID VALVE | CLOSE | OPEN | OPEN |
| FIRST CONTROL VALVE | — — | OPERATE | OPERATE |
| FIRST BLOWER | ON | OFF | ON |
| SECOND BLOWER | OFF | ON | ON |

FIG. 6

| | OPERATING MODE | | | | | | |
|---|---|---|---|---|---|---|---|
| | SINGLE EVAPORATOR OPERATING MODE | | | MULTIPLE EVAPORATOR OPERATING MODE | | | |
| | FIRST EVAPO. | SECOND EVAPO. | THIRD EVAPO. | FIRST, SECOND EVAPO. | FIRST, THIRD EVAPO. | SECOND, THIRD EVAPO. | ALL EVAPO. |
| FIRST SOLENOID VALVE | OPEN | CLOSE | CLOSE | OPEN | OPEN | CLOSE | OPEN |
| SECOND SOLENOID VALVE | CLOSE | OPEN | CLOSE | OPEN | CLOSE | OPEN | OPEN |
| THIRD SOLENOID VALVE | CLOSE | CLOSE | OPEN | CLOSE | OPEN | OPEN | OPEN |
| FIRST CONTROL VALVE | -- | OPERATE | -- | OPERATE | -- | OPERATE | OPETRATE |
| SECOND CONTROL VALVE | -- | -- | OPERATE | -- | OPERATE | OPERATE | OPERATE |
| FIRST BLOWER | ON | OFF | OFF | ON | ON | OFF | ON |
| SECOND BLOWER | OFF | ON | OFF | ON | OFF | ON | ON |
| THIRD BLOWER | OFF | OFF | ON | OFF | ON | ON | ON |

EJECTOR CYCLE HAVING MULTIPLE EVAPORATORS

CROSS REFERENCE TO RELATED APPLICATION

This application is based on and incorporates herein by reference Japanese Patent Application No. 2004-41163 filed on Feb. 18, 2004, Japanese Patent Application No. 2004-74892 filed on Mar. 16, 2004, Japanese Patent Application No. 2004-87066 filed on Mar. 24, 2004 and Japanese Patent Application No. 2004-290120 filed on Oct. 1, 2004.

BACKGROUND OF THE INVENTION

1. Field of the Invention

The present invention relates to an ejector cycle that includes an ejector, which serves as a depressurizing means for depressurizing fluid and which also serves as a momentum transporting pump for transporting the fluid by entraining action of discharged high velocity working fluid, so that such an ejector cycle is effectively applicable to, for example, a refrigeration cycle of a vehicle air conditioning and refrigerating system, which performs a passenger compartment cooling air conditioning operation and a refrigerator cooling operation through use of multiple evaporators.

2. Description of Related Art

Japanese Patent No. 1644707 discloses a vapor compression refrigeration cycle of FIG. 19, in which a portion of a refrigerant passage located downstream of a radiator 13 branches to two passages 51, 52. A cooling air conditioner evaporator 55 for cooling a vehicle passenger compartment is arranged in the passage 51, and a refrigerator evaporator 56 for cooling a refrigerator is arranged in the passage 52.

In the refrigeration cycle of Japanese Patent No. 1644707, the flow of the refrigerant is switched between the flow passage 51 for the passenger compartment cooling air conditioning operation and the flow passage 52 for the refrigerator cooling operation by switching solenoid valves 53, 54. In this way, the passenger compartment cooling air conditioning operation, which is performed through use of the cooling air conditioner evaporator 55, and the refrigerator cooling operation, which is performed through use of the refrigerator evaporator 56, are balanced.

Furthermore, with reference to FIG. 20, Japanese Patent No. 3322263 discloses a vapor compression refrigeration cycle (an ejector cycle), in which an ejector 14 is used as a refrigerant depressurizing means and a refrigerant circulating means. In the ejector cycle, a first evaporator 61 is arranged between a refrigerant outlet of the ejector 14 and a gas-liquid separator 63, and a second evaporator 62 is arranged between a liquid refrigerant outlet of the gas-liquid separator 63 and a suction inlet 14c of the ejector 14.

In the ejector cycle of Japanese Patent No. 3322263 shown in FIG. 20, the pressure drop, which is induced by the high velocity flow of the refrigerant at the time of expansion of the refrigerant discharged from a nozzle portion 14a of the ejector 14, is used to draw the gas phase refrigerant, which is discharged from the second evaporator 62, through the suction inlet 14c of the ejector 14. Also, the velocity energy of the refrigerant, which is generated at the time of expansion of the refrigerant in the ejector 14, is converted into the pressure energy at a diffuser portion (a pressurizing portion) 14b to increase the pressure of the refrigerant, which is discharged from the ejector 14. Thus, the pressurized refrigerant is supplied to the compressor 12, and thereby the drive force for driving the compressor 12 can be reduced. Therefore, the operational efficiency of the cycle can be improved.

Furthermore, the two evaporators 61, 62 can be used to absorb heat from and thereby to cool a common space or can be used to absorb heat from and thereby to cool different spaces, respectively.

However, in the case of the refrigeration cycle of Japanese Patent No. 1644707 shown in FIG. 19, the flow passage 51, which is used for the passenger compartment cooling air conditioning operation, and the flow passage 52, which is used for refrigerator cooling operation, are switched through use of a timer. Thus, during the refrigerator cooling operation, the passenger compartment cooling operation cannot be performed, so that air conditioning feeling of the passenger may be deteriorated. Furthermore, due to a difference in the states of the evaporators 55, 56 after the switching operation, the discharged refrigerant temperature (i.e., the discharged refrigerant pressure) of the compressor 12 will change significantly. For example, in the case where the thermal load of the currently operated evaporator 55, 56 after the switching operation is relatively large, the compressor 12 could be operated at the maximum capacity to cause development of the abnormally high pressure in the high pressure side pipe line, which, in turn, could cause stop of the entire operation.

In the case of the ejector cycle of Japanese Patent No. 3322263 shown in FIG. 20, the compressor 12 should receive only the gas phase refrigerant, and the second evaporator 62 should receive only the liquid state refrigerant. Thus, the gas-liquid separator 63, which separates the refrigerant discharged from the ejector 14 into the gas phase refrigerant and the liquid phase refrigerant, is required. Therefore, the manufacturing costs are disadvantageously increased.

Furthermore, a distributing ratio of the refrigerant to the first evaporator 61 and to the second evaporator 62 needs to be determined using the single ejector 14 while maintaining the refrigerant circulating (gas phase refrigerant drawing) operation of the ejector 14. Thus, it is difficult to appropriately adjust the flow rates of the refrigerant of the first and second evaporators 61, 62.

Furthermore, another previously proposed refrigeration cycle, which includes a plurality of evaporators, is shown in FIG. 21. FIG. 21 is a schematic diagram of the refrigeration cycle, which includes a previously proposed thermostatic expansion valve 105. In the refrigeration cycle, a refrigerant circulation passage R is divided into two passages R1, R2 at a point located on the downstream side of a radiator 102. One evaporator 104 is provided in the passage R1 and is used to perform, for example, passenger compartment cooling air conditioning operation. The other evaporator 106 is provided in the passage R2 and is used to perform, for example, refrigerator cooling operation. In the case of the refrigeration cycle, which uses the multiple evaporators, such as of a vehicle air conditioning system including a cool box (the refrigerator), the evaporator 104 for the passenger compartment cooling air conditioning operation and the evaporator 106 for the refrigerator cooling operation are temperature controlled to the desired evaporation temperatures, respectively, by intermittently opening and closing a solenoid valve 107 arranged in the refrigerant passage R2 for the refrigerator cooling operation to supply the refrigerant to the refrigerant passage R1 for the passenger compartment cooling air conditioning operation. Furthermore, the thermostatic expansion valve 105 and a fixed metering device 108 are provided as a depressurizing means. In FIG.

21, numeral 101 indicates a refrigerant compressor, and numeral 109 indicates a check valve. FIG. 22 is a schematic diagram, in which a box type thermostatic expansion valve 105 is provided in the refrigeration cycle of FIG. 21.

In a case where an ejector is used in the refrigeration cycle of FIG. 22, adjustment (e.g., the flow rate adjustment) to correspond with the load changes and effective response to the rapid change in the rotational speed of the compressor are required. To achieve them, Japanese Unexamined Patent Publication No. 2004-44906 (U.S. Patent Application Publication No. 2004/0007014A1) discloses an ejector, which shows a high efficiency and a high responsibility throughout the entire load range.

However, for example, when the ejector of Japanese Unexamined Patent Publication No. 2004-44906 (U.S. Patent Application Publication No. 2004/0007014A1) is used in the refrigeration cycle of FIG. 22, which includes the box type thermostatic expansion valve 105, the orientation of the ejector is limited. Thus, there is less freedom in designing of the refrigeration cycle, i.e., the ejector cycle having the ejector.

SUMMARY OF THE INVENTION

The present invention addresses the above disadvantages. Thus, it is an objective of the present invention to ease adjustment of a flow rate of refrigerant to multiple evaporators in an efficient ejector cycle having an ejector. It is another objective of the present invention to achieve easy adjustment of the flow rate of the refrigerant in the ejector cycle through use of a simple structure. It is a further objective of the present invention to provide an ejector cycle, which achieves both a simple structure and quick response while allowing flexible orientation of an ejector.

To achieve the objectives of the present invention, there is provided an ejector cycle, which includes a compressor, a radiator, an ejector, a first evaporator, a first branched passage, a first metering means and a second evaporator. The compressor draws and compresses refrigerant. The radiator radiates heat from the compressed high pressure refrigerant discharged from the compressor. The ejector includes a nozzle portion, a gas phase refrigerant suction inlet and a pressurizing portion. The nozzle portion depressurizes and expands the refrigerant on a downstream side of the radiator. Gas phase refrigerant is drawn from the gas phase refrigerant suction inlet by action of a flow of the high velocity refrigerant discharged from the nozzle portion. The pressurizing portion converts a velocity energy of a flow of a mixture of the high velocity refrigerant and the gas phase refrigerant into a pressure energy. The first evaporator evaporates the refrigerant, which is outputted from the ejector, to achieve a refrigeration capacity. A refrigerant outlet of the first evaporator is connected to a suction inlet of the compressor. The first branched passage branches a flow of the refrigerant at a corresponding branching point located between the radiator and the ejector. The first branched passage conducts the branched flow of the refrigerant to the gas phase refrigerant suction inlet of the ejector. The first metering means depressurizes the refrigerant on a downstream side of the radiator. The second evaporator is arranged in the first branched passage. The second evaporator evaporates the refrigerant to achieve a refrigeration capacity.

To achieve the objectives of the present invention, there is also provided an ejector cycle, which includes a compressor, a radiator, a first metering means, a first evaporator, an ejector, a first branched passage, a second metering means and a second evaporator. The compressor draws and compresses refrigerant. The radiator radiates heat from the compressed high pressure refrigerant discharged from the compressor. The first metering means depressurizes the refrigerant on a downstream side of the radiator. The first evaporator is connected between a refrigerant outlet of the first metering means and a suction inlet of the compressor. The first evaporator evaporates the low pressure refrigerant, which is outputted at least from the first metering means, to achieve a refrigeration capacity. The ejector includes a nozzle portion, a gas phase refrigerant suction inlet and a pressurizing portion. The nozzle portion depressurizes and expands the refrigerant on a downstream side of the radiator. Gas phase refrigerant is drawn from the gas phase refrigerant suction inlet by action of a flow of the high velocity refrigerant discharged from the nozzle portion. The pressurizing portion converts a velocity energy of a flow of a mixture of the high velocity refrigerant and the gas phase refrigerant into a pressure energy. The first branched passage branches a flow of the refrigerant at a corresponding branching point located between the radiator and the first metering means. The first branched passage conducts the branched flow of the refrigerant to the gas phase refrigerant suction inlet of the ejector. The second metering means is arranged in the first branched passage and depressurizes the refrigerant on a downstream side of the radiator. The second evaporator is arranged in the first branched passage on a downstream side of the second metering means. The second evaporator evaporates the refrigerant to achieve a refrigeration capacity.

BRIEF DESCRIPTION OF THE DRAWINGS

The invention, together with additional objectives, features and advantages thereof, will be best understood from the following description, the appended claims and the accompanying drawings in which:

FIG. 6 is a diagram showing various operating modes and control operation of corresponding components by the ECU according to the third embodiment;

DETAILED DESCRIPTION OF THE INVENTION

Various embodiments of the present invention will be described with reference to the accompanying drawings.

(First Embodiment)

Figure 1:
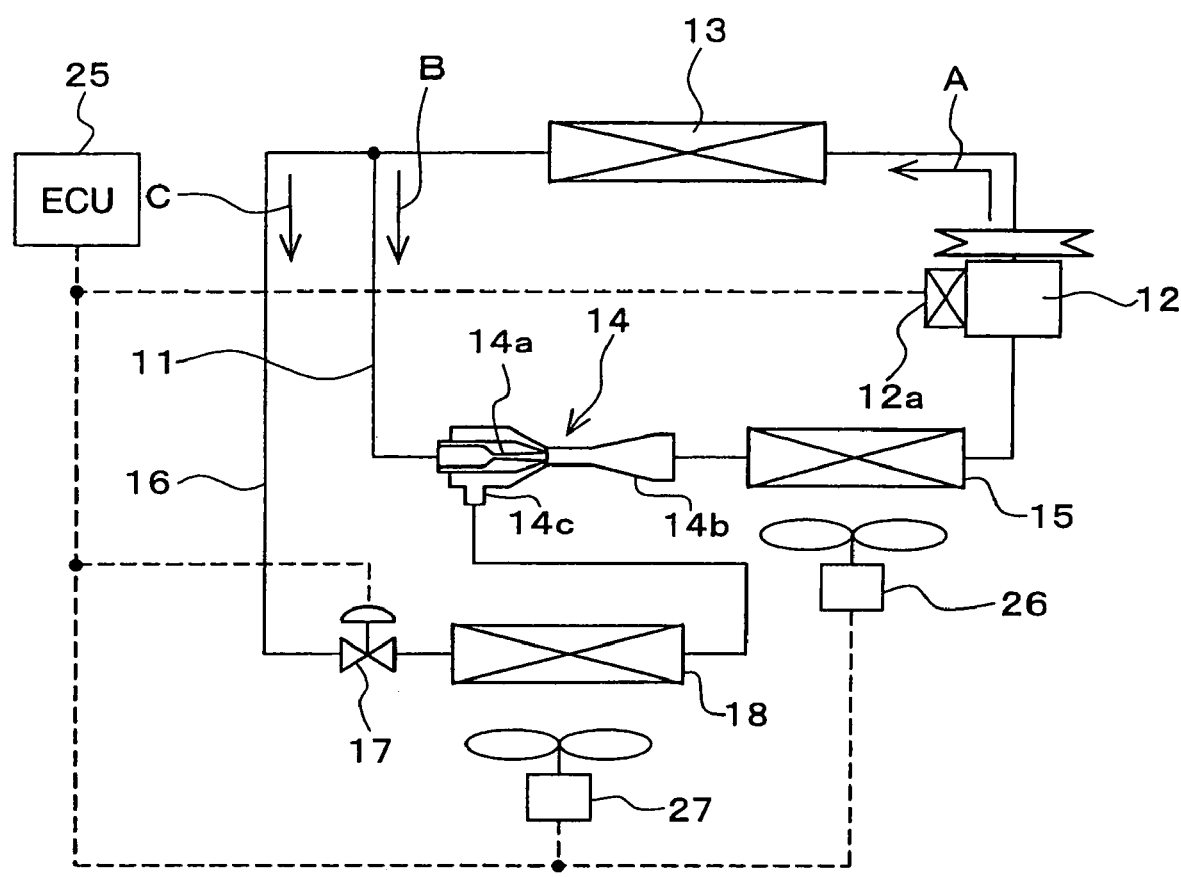
FIG. 1 is a schematic view of an ejector cycle according to a first embodiment of the present invention.

FIG. 1 shows an exemplary case where an ejector cycle according to a first embodiment of the present invention is implemented in a vehicle air conditioning and refrigerating system. The ejector cycle includes a refrigerant circulation passage 11, through with refrigerant is circulated. A compressor 12 is arranged in the refrigerant circulation passage 11. The compressor 12 draws and compresses the refrigerant supplied thereto.

In the present embodiment, the compressor 12 is rotated by, for example, a vehicle drive engine (not shown) through a belt or the like. The compressor 12 is a variable displacement compressor, which can adjust a refrigerant discharge rate through a change in its displacement. The displacement is defined as an amount of refrigerant discharged from the compressor 12 per rotation of the compressor 12. The displacement of the compressor 12 can be changed by changing an intake volume of the refrigerant in the compressor 12.

A swash plate compressor is most commonly used for this purpose and can be used as the variable displacement compressor 12. Specifically, in the swash plate compressor, a tilt angle of a swash plate is changed to change a piston stroke and thereby to change the intake volume of the refrigerant. A pressure (control pressure) in a swash plate chamber of the compressor 12 is changed by a pressure control electromagnetic device 12a, which constitutes a displacement control mechanism, so that a tilt angle of the swash plate is externally and electrically controlled.

A radiator 13 is arranged downstream of the compressor 12 in a refrigerant flow direction. The radiator 13 exchanges heat between the high pressure refrigerant, which is discharged from the compressor 12, and the external air (external air supplied from outside of the vehicle), which is blown toward the radiator 13 by a cooling fan (not shown), so that the high pressure refrigerant is cooled.

An ejector 14 is arranged further downstream of the radiator 13 in the refrigerant flow direction. The ejector 14 serves as a depressurizing means for depressurizing the fluid and is formed as a momentum-transporting pump, which performs fluid transportation by entraining action of discharged high velocity working fluid (see JIS Z 8126 Number 2.1.2.3).

The ejector 14 includes a nozzle portion 14a and a suction inlet 14c. The nozzle portion 14a reduces a cross sectional area of the refrigerant passage, which conducts the refrigerant discharged from the radiator 13, to isentropically depressurize and expand the high pressure refrigerant. The suction inlet 14c is arranged in a space, in which a refrigerant discharge outlet of the nozzle portion 14a is located. The suction inlet 14c draws gas phase refrigerant supplied from a second evaporator 18. Furthermore, a diffuser portion 14b, which serves as a pressurizing portion, is arranged downstream of the nozzle portion 14a and the suction inlet 14c in the refrigerant flow direction. The diffuser portion 14b is formed to progressively increase a cross sectional area of its refrigerant passage toward its downstream end, so that the diffuser portion 14b decelerates the refrigerant flow and increases the refrigerant pressure, i.e., the diffuser portion 14b converts the velocity energy of the refrigerant to the pressure energy.

The refrigerant discharged from the diffuser portion 14b of the ejector 14 is supplied to a first evaporator 15. The first evaporator 15 is arranged in, for example, an air passage of a vehicle passenger compartment air conditioning unit (not shown) to cool the air discharged into the passenger compartment and thereby to cool the passenger compartment.

More specifically, the passenger compartment conditioning air is blown from an electric blower (a first blower) 26 of the vehicle passenger compartment air conditioning unit toward the first evaporator 15. In the first evaporator 15, the low pressure refrigerant, which has been depressurized by the ejector 14, absorbs heat from the passenger compartment conditioning air and thereby evaporates into gas phase refrigerant, so that the passenger compartment conditioning air is cooled to cool the passenger compartment. The gas phase refrigerant, which has been evaporated in the first evaporator 15, is drawn into the compressor 12 and is re-circulated through the refrigerant circulation passage 11.

Furthermore, in the ejector cycle of the present embodiment, a first branched passage 16 is formed. The first branched passage 16 is branched from a corresponding branching portion of the refrigerant circulation passage 11 between the radiator 13 and the ejector 14 on the downstream side of the radiator 13 and is then rejoined with the refrigerant circulation passage 11 at the suction inlet 14c of the ejector 14.

A first flow rate control valve (a first metering means) 17 is arranged in the first branched passage 16. The first flow rate control valve 17 controls the flow rate of the refrigerant and depressurizes the refrigerant. A valve opening degree of the first flow rate control valve 17 can be electrically controlled. The second evaporator 18 is arranged downstream of the first flow rate control valve 17 in the refrigerant flow direction.

The second evaporator 18 is arranged in, for example, a vehicle refrigerator (not shown) to cool an interior of the refrigerator. Internal air of the refrigerator is blown by an electric blower (a second blower) 27 toward the second evaporator 18.

In the present embodiment, the pressure control electromagnetic device 12a of the variable displacement compressor 12, the first and second blowers 26, 27 and the first flow rate control valve 17 are electrically controlled by a corresponding control signal outputted from an electronic control unit (ECU).

Next, operation of the present embodiment will be described with reference to the above structure. When the compressor 12 is driven by the vehicle engine, the refrigerant is compressed in the compressor 12, and therefore the high temperature and high pressure refrigerant is discharged from the compressor 12 in a direction of an arrow A and is supplied to the radiator 13. In the radiator 13, the high temperature refrigerant is cooled by the external air and is thus condensed. The liquid state refrigerant, which is discharged from the radiator 13 is divided into a flow of an arrow B passing through the refrigerant circulation passage 11 and a flow of an arrow C passing through the first branched passage 16.

The refrigerant (the arrow C), which passes through the first branched passage 16, is depressurized through the first flow rate control valve 17 and thus becomes the low pressure refrigerant. Then, in the second evaporator 18, the low pressure refrigerant absorbs heat from the interior air of the refrigerator, which is blown by the second blower 27, so that the refrigerant evaporates. In this way, the second evaporator 18 cools the interior of the refrigerator.

Here, the refrigerant flow rate in the first branched passage 16, i.e., the refrigerant flow rate in the second evaporator 18 is adjusted by controlling the valve opening degree of the first flow rate control valve 17 of the first branched passage 16 through the ECU (a control means) 25. Therefore, the cooling capacity of the subject cooling space (specifically, the interior space of the refrigerator), which is cooled by the second evaporator 18, is controlled by controlling the valve opening degree of the first flow rate control valve 17 and a rotational speed, i.e., an rpm (the air flow rate) of the second blower 27 through the ECU 25.

The gas phase refrigerant, which is outputted from the second evaporator 18, is drawn into the suction inlet 14c of the ejector 14. The refrigerant flow of the arrow B, which flows in the refrigerant circulation passage 11, is supplied to a refrigerant inlet (a drive flow inlet) of the nozzle portion 14a of the ejector 14. The refrigerant is depressurized and is expanded through the nozzle portion 14a. Thus, the pressure energy of the refrigerant is converted into the velocity energy in the nozzle portion 14a and is discharged from the outlet of the nozzle portion 14 at the high speed. Due to the decrease in the refrigerant pressure, the gas phase refrigerant, which is evaporated in the second evaporator 18, is drawn through the suction inlet 14c.

The refrigerant, which is discharged from the nozzle portion 14a, and the refrigerant, which is drawn into the suction inlet 14c, are mixed at the downstream side of the nozzle portion 14a and are then supplied to the diffuser portion 14b. Due to the increase in the cross sectional area of the refrigerant passage in the diffuser portion 14b, the velocity energy (expansion energy) of the refrigerant is converted to the pressure energy. Thus, the pressure of the refrigerant is increased. The refrigerant discharged from the diffuser portion 14b of the ejector 14 is supplied to the first evaporator 15.

In the first evaporator 15, the refrigerant absorbs heat from the conditioning air to be discharged into the vehicle passenger compartment, so that the refrigerant evaporates. After the evaporation, the gas phase refrigerant is drawn into the compressor 12 and is compressed. Thereafter, the refrigerant is discharged from the compressor 12 and flows in the direction of the arrow A in the refrigerant circulation passage 11. Here, the ECU 25 controls the volume (displacement) of the compressor 12 to control the refrigerant discharge rate of the compressor 12, so that the flow rate of the refrigerant supplied to the first evaporator 15 is adjusted. Furthermore, the ECU 25 controls the rpm (the air flow rate) of the first blower 26 to control the cooling capacity for cooling the subject cooling space, which is cooled by the first evaporator 15, more specifically the cooling capacity for cooling the vehicle passenger compartment.

Next, advantages of the first embodiment will be described.

(1) The first evaporator 15 is arranged downstream of the diffuser portion 14b of the ejector 14, and the first branched passage 16 branches from the refrigerant circulation passage 11 at the downstream side of the radiator 13 and is connected to the suction inlet 14c of the ejector 14. The first flow rate control valve 17 and the second evaporator 18 are arranged in the first branched passage 16. Therefore, the cooling operation can be simultaneously performed at both the first and second evaporators 15, 18.

(2) The refrigerant evaporation pressure of the first evaporator 15 is the pressure after the pressurization through the diffuser portion 14b. In contrast, the outlet of the second evaporator 18 is connected to the suction inlet 14c of the ejector 14. Thus, the lowest pressure right after the depressurization at the nozzle portion 14a can be applied to the outlet of the second evaporator 18.

In this way, the refrigerant evaporation pressure (the refrigerant evaporation temperature) of the second evaporator 18 can be made lower than that of the first evaporator 15. Thus, the cooling operation at the higher temperature range, which is suitable for cooling the vehicle passenger compartment, can be performed by the first evaporator 15. At the same time, the cooling operation at the lower temperature range, which is lower than the higher temperature range and is suitable for cooling the interior of the refrigerator, can be performed by the second evaporator 18.

As described above, even with the above simple structure, in which the first branched passage 16 is added, the cooling operation at the higher temperature range, which is suitable for cooling the vehicle passenger compartment, and the cooling operation at the lower temperature range, which is suitable for cooling the interior of the refrigerator, can be implemented. That is, the cooling operations at the two different temperature ranges can be implemented.

(3) As discussed above, the flow rate of the refrigerant supplied to the first evaporator 15 can be controlled by controlling the refrigerant discharge rate of the compressor 12. Furthermore, the cooling capacity of the first evaporator 15 can be controlled by controlling the air flow rate of the first blower 26.

Furthermore, the cooling capacity of the second evaporator 18 can be controlled by controlling the refrigerant flow rate through the first flow rate control valve 17 and by controlling the air flow rate of the second blower 27.

As discussed above, the cooling capacity of the first evaporator 15 and the cooling capacity of the second evaporator 18 can be individually controlled. Thus, it is relatively easy to correspond to a change in the thermal load in the first and second evaporators 15, 18.

(4) The depressurized two-phase refrigerant, which is depressurized through the first flow rate control valve 17 and includes both the gas phase refrigerant and the liquid phase refrigerant, can be supplied to the second evaporator 18 through the first branched passage 16. Thus, unlike Japanese Patent No. 3322263 of FIG. 20, there is no need to provide the gas-liquid separator 63 at the downstream side of the first evaporator 61 to supply the liquid phase refrigerant to the second evaporator 62.

Furthermore, as discussed above, the control of the refrigerant flow rate at the first evaporator 15 and the control of the refrigerant flow rate at the second evaporator 18 can be individually performed through the control of the refrigerant discharge rate of the compressor 12 and also through the control of the valve opening degree of the first flow rate control valve 17. Thus, the control of the refrigerant flow rate of each evaporator 15, 18 can be appropriately performed based on its thermal load. Therefore, the refrigerant flow rate can be adjusted in such a manner that the entire refrigerant becomes the gas phase refrigerant at the first evaporator 15, which is located downstream of the ejector 14.

Figure 20:
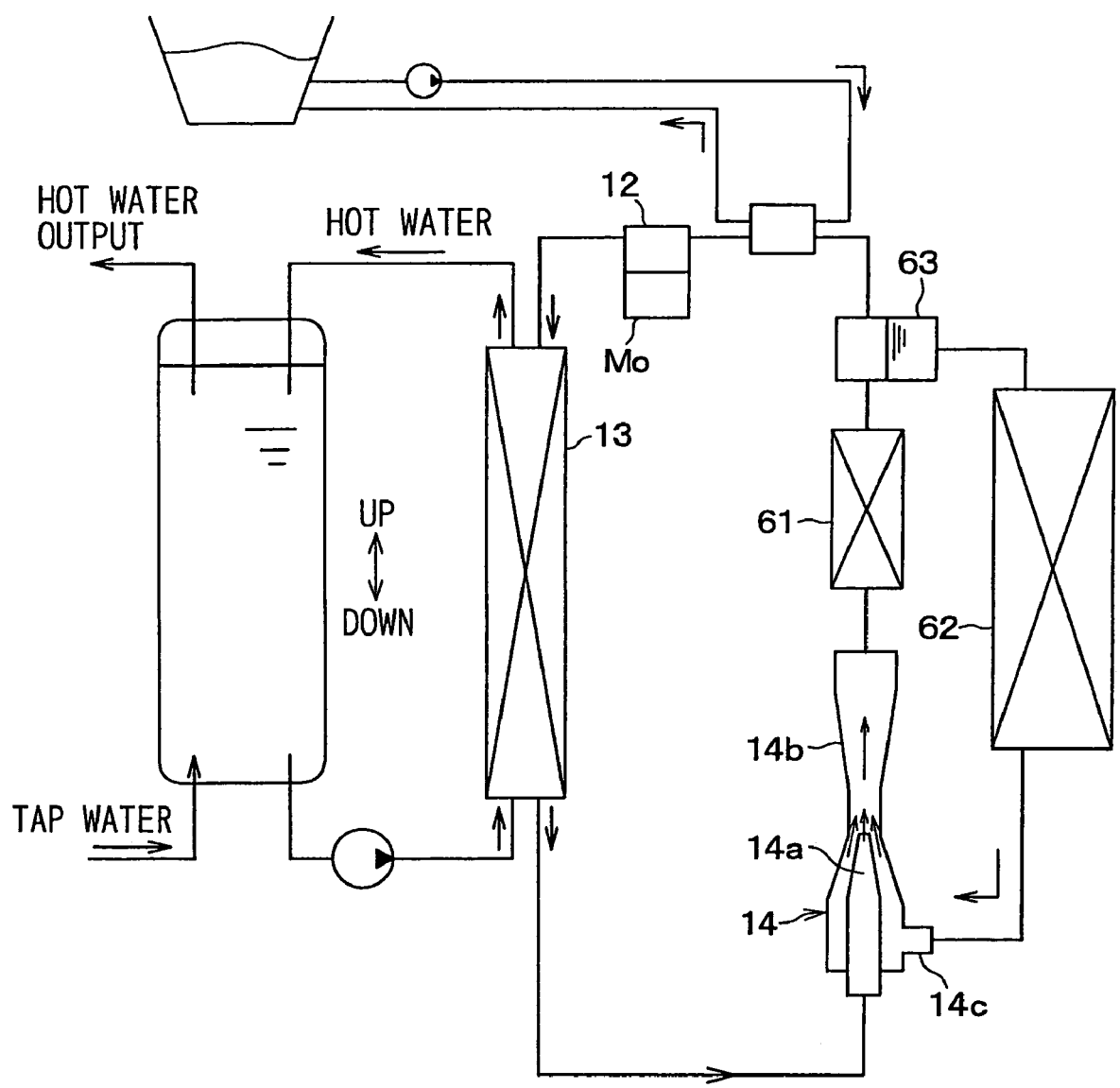
FIG. 20 is a schematic view of a prior art ejector cycle.
Figure 21:
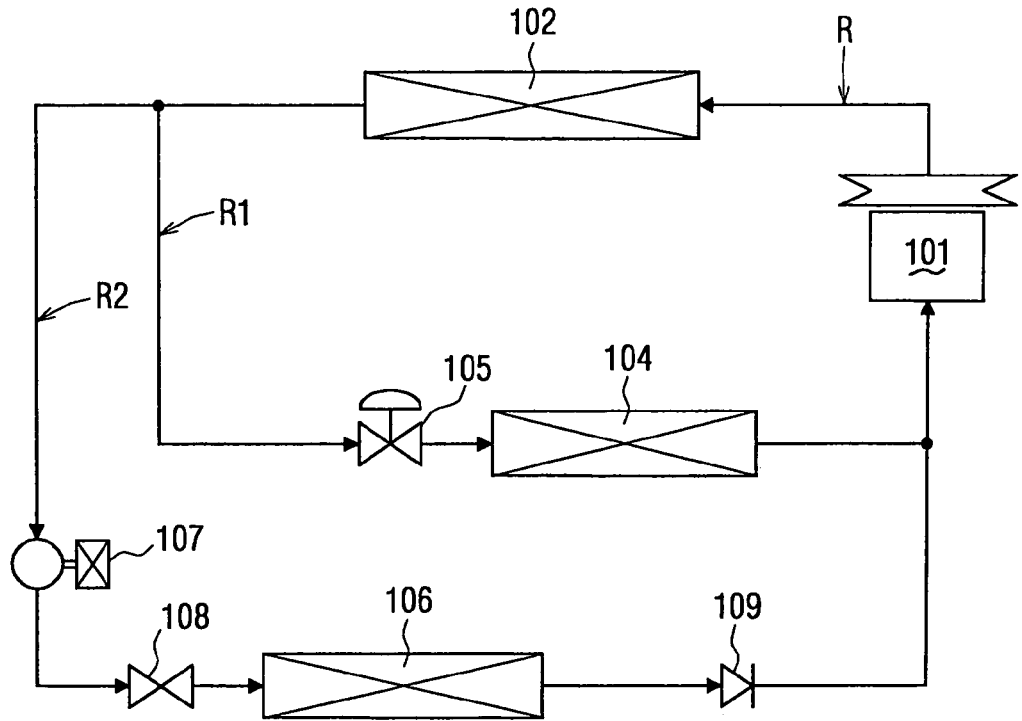
FIG. 21 is a schematic diagram of a refrigeration cycle, which uses a previously proposed thermostatic expansion valve.
Figure 22:
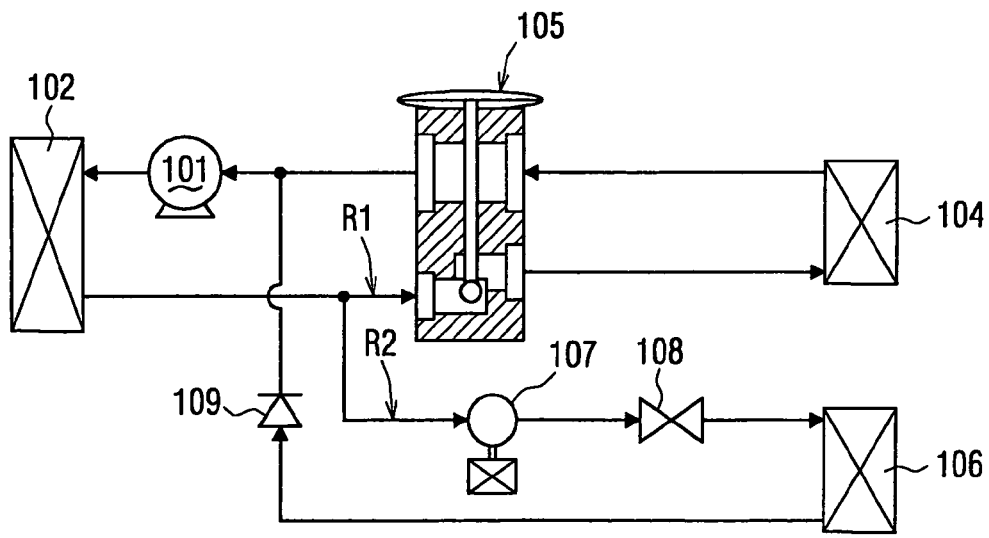
FIG. 22 is a schematic diagram showing a case where a box type thermostatic expansion valve is used in the refrigeration cycle of FIG. 21.

Therefore, according to the present embodiment, it is possible to eliminate the gas-liquid separator 63, which is required in Japanese Patent No. 3322263 of FIG. 20. As a result, the manufacturing costs of the ejector cycle can be reduced.

(5) The pressure of the refrigerant is increased by the diffuser portion 14b of the ejector 14, so that the intake refrigerant pressure of the compressor 12 can be increased. In this way, the drive power for driving the compressor 12 can be minimized to improve the efficiency of the cycle.

(Second Embodiment)

Figure 2:
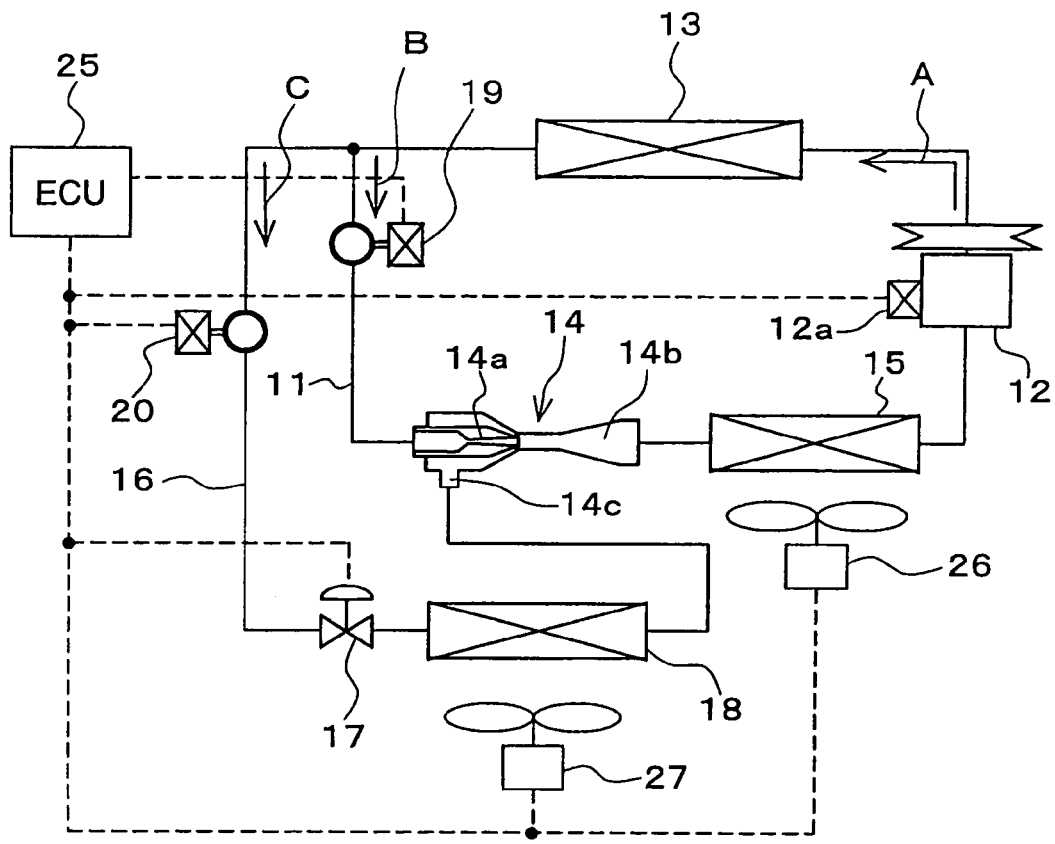
FIG. 2 is a schematic view of an ejector cycle according to a second embodiment.

FIG. 2 shows an ejector cycle of a second embodiment, which is similar to that of the first embodiment except first and second solenoid valves (a first opening and closing means and a second opening and closing means) 19, 20. The first solenoid valve 19 opens and closes the refrigerant circulation passage 11 on the upstream side of the ejector 14. The second solenoid valve 20 opens and closes the first branched passage 16 on the upstream side of the first flow rate control valve 17. Similar to the pressure control electromagnetic device 12a of the compressor 12, the opening and closing of the first and second solenoid valves 19, 20 are controlled by a corresponding signal supplied from the ECU 25.

Selection of an operating mode conducted by the ECU 25 will be described with reference to FIG. 3. First, user input information, temperature information of each subject cooling space and the temperature information of each evaporator 15, 18 are inputted to the ECU 25 at step S110. The user information includes, for example, presence of a need (ON, OFF) for cooling the subject cooling space and the desired set temperature of the subject cooling space.

Next, at step S120, a target temperature of each subject cooling space or a target temperature of each evaporator 15, 18 is determined by the ECU 25 based on the information inputted at step S110. In this way, the subject evaporator(s), which needs to be operated to achieve the required cooling capacity by supplying the refrigerant therethrough, is determined. Based on the respective target temperature, the best operating mode is determined with reference to, for example, FIG. 4 at step S130.

In the present embodiment, a first evaporator operating mode (FIRST EVAPO. in FIG. 4), a second evaporator operating mode (SECOND EVAPO. in FIG. 4) and a multiple evaporator operating mode (MULTIPLE EVAPO. in FIG. 4) are provided. In the first evaporator operating mode, only the first evaporator 15 is operated to attain its cooling capacity. In the second evaporator operating mode, only the second evaporator 18 is operated to attain its cooling capacity. In the multiple evaporator operating mode, both the first and second evaporators 15, 18 are operated to attain its cooling capacity.

For example, when a user actuates the cycle and sets the temperature of the subject cooling space, which is cooled by the first evaporator 15, i.e., when the first evaporator 15 needs to be operated to attain its cooling capacity, the first evaporator operating mode is selected. Based on the selected operating mode, the ECU 25 controls the first and second solenoid valves 19, 20, the first flow rate control valve (FIRST CONTROL VALVE in FIG. 4) 17 and the first and second blowers 26, 27 in the manner indicated in FIG. 4.

Thereafter, the ECU 25 controls the electrical device(s), such as the pressure control electromagnetic device 12a of the compressor 12, to adjust the temperature of the subject cooling space to the set temperature at step S140. In the above described manner, each operating mode shown in FIG. 4 can be selected and can be set by the ECU 25.

This point will be more specifically described. At the time of the first evaporator operating mode, the ECU 25 opens the first solenoid valve 19 and closes the second solenoid valve 20. Then, the ECU 25 controls the volume (the refrigerant discharge rate) of the compressor 12 to control the flow rate of the refrigerant supplied to the first evaporator 15. In this way, it is possible to adjust the total amount of heat, which is absorbed by the refrigerant at the first evaporator 15 from the air to be discharged into the subject cooling space. Furthermore, the flow rate of the cooling air into the subject cooling space, which is cooled by the first evaporator 15, is controlled by controlling the rpm (the air flow rate) of the first blower 26. In this way, the cooling capacity of the first evaporator 15 (more specifically, the cooling capacity for cooling the vehicle passenger compartment) is adjusted.

Furthermore, in the second evaporator operating mode, the ECU 25 closes the first solenoid valve 19 and opens the second solenoid valve 20. The flow rate of the refrigerant, which is supplied to the second evaporator 18, is controlled by controlling the volume (the refrigerant discharge rate) of the compressor 12 and the valve opening degree of the first flow rate control valve 17.

Furthermore, the flow rate of the cooling air into the subject cooling space, which is cooled by the second evaporator 18, is controlled by controlling the rpm (the air flow rate) of the second blower 27. In this way, the cooling capacity of the second evaporator 18 (more specifically, the cooling capacity for cooling the interior of the refrigerator) is controlled.

Furthermore, in the multiple evaporator operating mode, the ECU 25 opens both the first and second solenoid valves 19, 20. Then, the ECU 25 controls the volume (the refrigerant discharge rate) of the compressor 12 to control the flow rate of the refrigerant supplied to the first evaporator 15. The flow rate of the refrigerant, which is supplied to the second evaporator 18, is adjusted by adjusting the valve opening degree of the first flow rate control valve 17.

In addition, by individually controlling the rpm (the air flow rate) of the first blower 26 and the rpm (the air flow rate) of the second blower 27, the flow rate of the cooling air discharged into the subject cooling space of the first evaporator 15 and the flow rate of the cooling air discharged into the subject cooling space of the second evaporator 18 are individually controlled. In this way, the cooling capacity of the first evaporator 15 and the cooling capacity of the second evaporator 18 are individually controlled.

When the pressure of the refrigerant, which is supplied to the ejector 14, is increased by increasing the volume (the refrigerant discharge rate) of the compressor 12, the suction capacity of the ejector 14 for drawing the gas phase refrigerant, which is evaporated in the second evaporator 18, is increased. Even in this way, the flow rate of the refrigerant, which flows through the second evaporator 18, can be controlled.

Furthermore, in the second evaporator operating mode, the refrigerant is supplied only to the second evaporator 18, so that the refrigeration oil, which remains in the second evaporator 18, can be returned to the compressor 12.

(Third Embodiment)

Figures 4, 5:
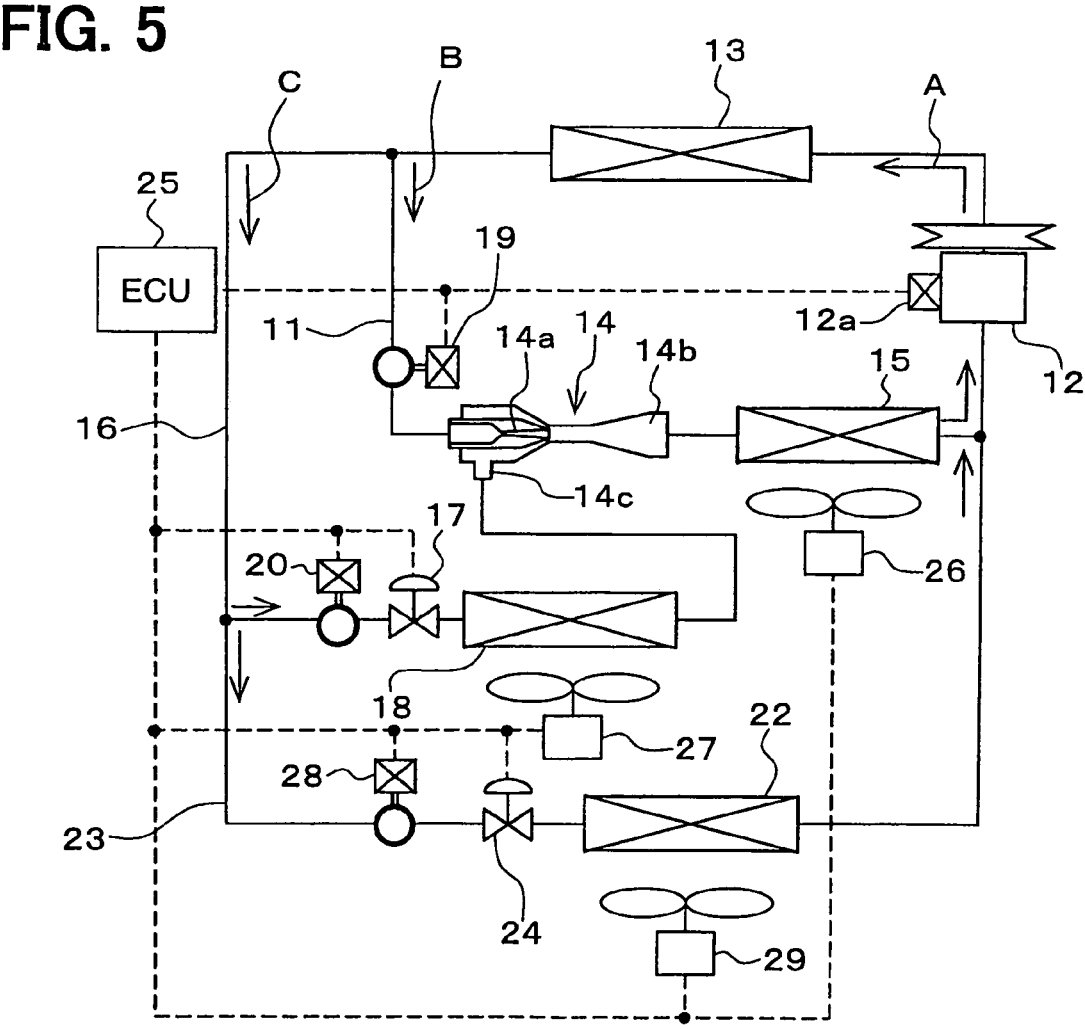
FIG. 4 is a diagram showing various operating modes and control operation of corresponding components by the ECU according to the second embodiment.
FIG. 5 is a schematic view of an ejector cycle according to a third embodiment.

FIG. 5 shows an ejector cycle according to a third embodiment. The ejector cycle of the third embodiment is similar to that of the second embodiment except a second branched passage 23. The second branched passage 23 connects between a portion (a branching point) of the first branched passage 16, which is on the upstream side of the first flow rate control valve 17, and a portion (a merging point) of the refrigerant passage 11, which connects between the first evaporator 15 and the compressor 12.

A second flow rate control valve (a second metering means) 24 and a third solenoid valve (a third opening and closing means) 28 are arranged in the second branched passage 23. The second flow rate control valve 24 controls the flow rate of the refrigerant and depressurizes the refrigerant. The third solenoid valve 28 opens and closes the second branched passage 23. Furthermore, a third evaporator 22 is arranged on the downstream side of the second flow rate control valve 24 in the refrigerant flow direction in the second branched passage 23. The air of a subject cooling space of the third evaporator 22 is blown by an electric blower (a third blower) 29 toward the third evaporator 22.

Here, a downstream side of the third evaporator 22 is connected to a downstream side of the first evaporator 15 and is thus connected to the suction inlet side of the compressor 12. Thus, the refrigerant evaporation pressure of the first evaporator 15 and the refrigerant evaporation pressure of the third evaporator 22 are generally the same as the suction pressure of the compressor 12. Thus, the refrigerant evaporation temperature of the first evaporator 15 and the refrigerant evaporation temperature of the third evaporator 22 are also the same.

Therefore, for example, a front seat side space of the vehicle passenger compartment can be set as the subject cooling space of the first evaporator 15, and a rear seat side space of the vehicle passenger compartment can be set as the subject cooling space of the third evaporator 22. In this way, the front seat side space and the rear seat side space of the vehicle passenger compartment can be simultaneously cooled by the first and third evaporators 15, 22, respectively.

In the third embodiment, the second flow rate control valve 24, the third solenoid valve 28 and the third blower 29 are also controlled by a corresponding control signal, which is supplied from the ECU 25.

Figure 3:
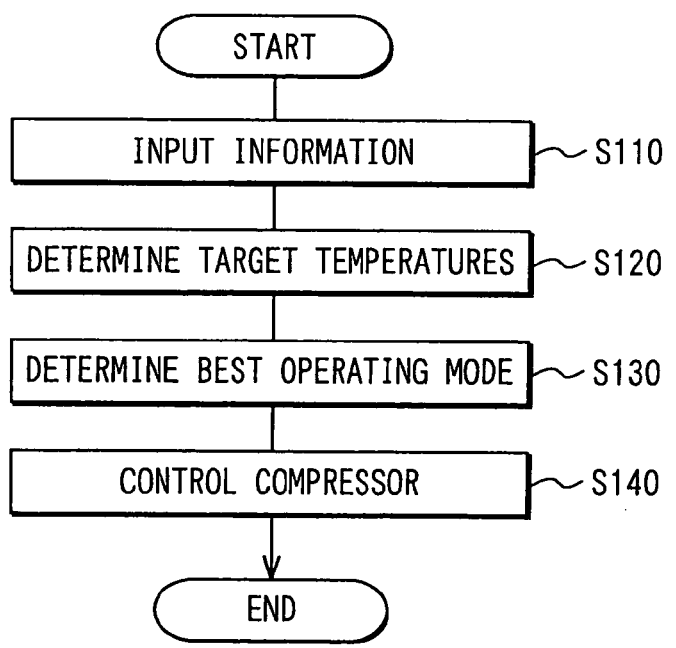
FIG. 3 is a flow chart showing control operation performed by an ECU in the second embodiment.

The control operation of the ECU 25 of the third embodiment is substantially the same as that of the second embodiment except step S130 of FIG. 3. That is, in the second embodiment, the operating mode is determined with reference to FIG. 4. In contrast, in the third embodiment, the operating mode is determined with reference to FIG. 6.

In the third embodiment, the number of controlled elements, which are controlled by the ECU 25, is increased in comparison to that of the second embodiment, so that the number of the operating modes is increased, as shown in FIG. 6. However, similar to the second embodiment, the control flow of the ECU 25 is determined based on the operating mode of the corresponding required evaporator(s), which is required to attain the required cooling capacity (see S130 in FIG. 3).

The operating modes of the third embodiment will be described further. The first evaporator operating mode (FIRST EVAPO.) and the second evaporator operating mode (SECOND EVAPO.) of the third embodiment are similar to those of the second embodiment. In the third evaporator operating mode (THIRD EVAPO.), the ECU 25 closes the first and second solenoid valves 19, 20 and opens the third solenoid valve 28.

The flow rate of the refrigerant, which is supplied to the third evaporator 22, is controlled by controlling the volume (the refrigerant discharge rate) of the compressor 12 and the valve opening degree of the second flow rate control valve (SECOND CONTROL VALVE) 24. Furthermore, the flow rate of the cooling air into the subject cooling space of the third evaporator 22 is controlled by controlling the rpm (the air flow rate) of the third blower 29. In this way, the cooling capacity of the third evaporator 22 (more specifically, the cooling capacity for cooling the rear seat side space of the vehicle passenger compartment) is controlled.

In a first and second evaporator operating mode (FIRST, SECOND EVAPO. in FIG. 6), the ECU 25 opens the first and second solenoid valves 19, 20 and closes the third solenoid valve 28. The compressor 12, the first flow rate control valve 17 and the first and second blowers 26, 27 are controlled in a manner similar to that of the multiple evaporator operating mode of the second embodiment to control the cooling capacities of the first and second evaporators 15, 18.

In a first and third evaporator operating mode (FIRST, THIRD EVAPO. in FIG. 6), the ECU 25 opens the first and third solenoid valves 19, 28 and closes the second solenoid valve 20. Then, the flow rate of the refrigerant, which is supplied to the first evaporator 15, is controlled by controlling the volume (the refrigerant discharge rate) of the compressor 12. Also, the flow rate of the refrigerant, which is supplied to the third evaporator 22, is controlled by controlling the valve opening degree of the second flow rate control valve 24. Furthermore, the flow rate of the cooling air into the subject cooling space of the first evaporator 15 and the flow rate of the cooling air into the subject cooling space of the third evaporator 22 are controlled by controlling the rpm (the air flow rate) of the first blower 26 and the rpm (the air flow rate) of the third blower 29, respectively. In this way, the cooling capacity of the first evaporator 15 and the cooling capacity of the third evaporator 22 are controlled.

In a second and third evaporator operating mode (SECON, THIRD EVAPO.), the ECU 25 opens the second and third solenoid valves 20, 28 and closes the first solenoid valve 19. The cooling capacity of the second evaporator 18 and the cooling capacity of the third evaporator 22 are controlled by controlling the volume (the refrigerant discharge rate) of the compressor 12, the valve opening degrees of the first and second flow rate control valves 17, 24 and the air flow rates of the second and third blowers 27, 29.

In a first to third evaporator operating mode (ALL EVAPO. in FIG. 6), the ECU 25 opens all of the first to third solenoid valves 19, 20, 28. Then, the flow rate of the refrigerant, which is supplied to the first evaporator 15, is controlled by controlling the volume (the refrigerant discharge rate) of the compressor 12. Also, the flow rate of the refrigerant to the second evaporator 18 and the flow rate of the refrigerant to the third evaporator 22 are controlled by controlling the valve opening degrees of the first and second flow rate control valve 17, 24, respectively.

Furthermore, the rpm's (the air flow rates) of the first to third blowers 26, 27, 29 are controlled to control the flow rates of the cooling air discharged into the corresponding subject cooling spaces, respectively. In this way, the cooling capacity of the first evaporator 15, the cooling capacity of the second evaporator 18 and the cooling capacity of the third evaporator 22 are individually controlled.

In the above described manner, each operating mode shown in FIG. 6 can be selected and can be set by the ECU 25. Thus, the common subject cooling space or the multiple subject cooling spaces can be controlled by one or more of the three evaporators 15, 18, 22.

Furthermore, in the second evaporator operating mode, the refrigerant is supplied only to the second evaporator 18. Also, in the third evaporator operating mode, the refrigerant is supplied only to the third evaporator 22. Thus, the refrigerant remained in the second evaporator 18 or the third evaporator 22 can be returned to the compressor 12.

(Fourth Embodiment)

Figure 7:
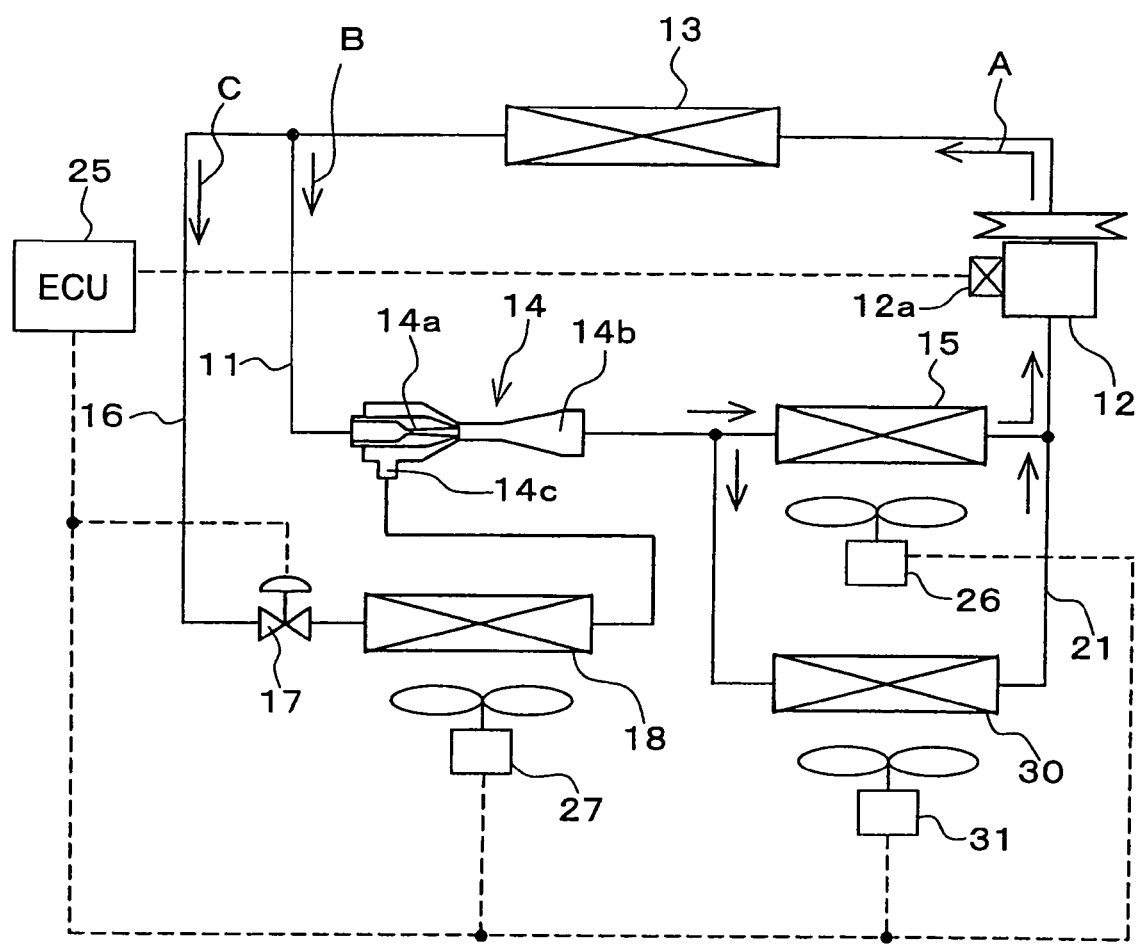
FIG. 7 is a schematic view of an ejector cycle according to a fourth embodiment.

FIG. 7 shows an ejector cycle of a fourth embodiment. The ejector cycle of the fourth embodiment is similar to the ejector cycle of the first embodiment except a third branched passage 21. The third branched passage 21 extends from a portion (a branching point) of the refrigerant circulation passage 11, which is located between the ejector 14 and the first evaporator 15, to another portion (a merging point) of the refrigerant circulation passage 11, which is located between the first evaporator 15 and the compressor 12. A fourth evaporator (or a third evaporator) 30 is arranged in the third branched passage 21. A fourth blower (or a third blower) 31, which is an electric blower, is arranged to oppose the fourth evaporator 30.

In this way, in addition to the first and second evaporators 15, 18, a predetermined subject cooling space can be cooled by the fourth evaporator 30. Here, a downstream side of the fourth evaporator 30 is connected to a downstream side of the first evaporator 15 and is thus connected to the suction inlet side of the compressor 12. Thus, the refrigerant evaporation pressure of the first evaporator 15 and the refrigerant evaporation pressure of the fourth evaporator 30 are generally the same as the suction pressure of the compressor 12. Thus, the refrigerant evaporation temperature of the first evaporator 15 and the refrigerant evaporation temperature of the fourth evaporator 30 are also the same.

Even in the fourth embodiment, similar to the third embodiment, the common subject cooling space or the multiple subject cooling spaces can be cooled by the three evaporators 15, 18, 30.

(Fifth Embodiment)

In each of the first to fourth embodiments, the ejector 14 and the first evaporator 15 are connected in series. Thus, the ejector 14 has the flow rate adjusting function for adjusting the flow rate of the refrigerant to the first evaporator 15 and also has the pumping function for creating a refrigerant pressure difference between the first evaporator 15 and the second evaporator 18.

Therefore, at the time of designing the ejector 14, the required specification for achieving both the flow rate adjusting function and the pumping function should be satisfied. Thus, in order to achieve the flow rate adjusting function for adjusting the flow rate of the refrigerant to the first evaporator 15, the design needs to rely on the first evaporator 15. As a result, the operation of the ejector cycle at the high efficiency becomes difficult.

Thus, in the fifth embodiment, the ejector 14 has only the pumping function without the flow rate adjusting function for adjusting the flow rate of the first evaporator 15 to allow easy designing of the ejector 14, which enables the highly efficient operation of the ejector cycle.

The fifth embodiment will be described more specifically with reference to FIG. 8. In the refrigerant circulation passage 11, a dedicated metering mechanism (a first metering means) 32 is provided between the outlet of the radiator 13 and the inlet of the first evaporator 15. Furthermore, in the fifth embodiment, the ejector 14 is not provided in the refrigerant circulation passage 11. Rather, the ejector 14 is provided in parallel with the metering mechanism 32.

Although various devices can be used as the metering mechanism 32, a thermostatic expansion valve, which controls its valve opening degree in a manner that keeps the superheat of the refrigerant at the outlet of the first evaporator 15 at a predetermined value, is used as the metering mechanism 32 in the present embodiment.

A metering mechanism (a second metering means) 17 and the second evaporator 18 are arranged in series in the first branched passage 16, which branches from the portion of the refrigerant circulation passage 11 between the outlet of the radiator 13 and the inlet of the ejector 14. Furthermore, the outlet of the second evaporator 18 is connected to the suction inlet 14c of the ejector 14. Although various devices can be used as the metering mechanism 17 of the first branched passage 16, a fixed metering device, such as a capillary tube of a simple structure, is used as the metering mechanism 17 in this embodiment.

Next, operation of the fifth embodiment will be described. When the compressor 12 is operated, the discharged refrigerant, which is discharged from the compressor 12, releases the heat to the external air and is condensed in the radiator 13. Thereafter, the flow of the condensed refrigerant is divided into the following three flows.

That is, the first refrigerant flow passes the metering mechanism 32 and is depressurized. Then, the first refrigerant flow enters the first evaporator 15. The second refrigerant flow passes the nozzle portion 14a of the ejector 14 and is depressurized. Then, the second refrigerant flow passes the diffuser portion 14b and is pressurized. Thereafter, the second refrigerant flow enters the first evaporator 15. The third refrigerant flow passes the metering mechanism 17 and is depressurized. Thereafter, the third refrigerant flow passes the second evaporator 18 and is then drawn into the suction inlet 14c of the ejector 14.

Even in the fifth embodiment, the ejector 14 performs the pumping function. That is, the ejector 14 draws the refrigerant present at the outlet of the second evaporator 18 and mixes the drawn refrigerant with the refrigerant flow (drive flow), which has passed the nozzle portion 14a, so that the mixed refrigerant is pressurized at the diffuser portion 14b. Thus, the evaporation pressure of the first evaporator 15 is higher than the evaporation pressure of the second evaporator 18, so that the pressure difference (the refrigerant evaporation temperature difference) is created between the evaporation pressure of the second evaporator 18 and the evaporation pressure of the first evaporator 15.

The flow rate of the refrigerant, which enters the first evaporator 15, can be controlled through the dedicated metering mechanism 32. Thus, the ejector 14 does not need to have the flow rate adjusting function for adjusting the flow rate of the first evaporator 15. Similarly, the flow rate of the refrigerant, which enters the second evaporator 18, is controlled through the dedicated metering mechanism 17. Thus, the function of the ejector 14 is specialized to the pumping function for creating the pressure difference between the first evaporator 15 and the second evaporator 18.

In this way, the configuration of the ejector 14 can be designed to create the predetermined pressure difference between the first evaporator 15 and the second evaporator 18, i.e., to set the flow rate of the refrigerant in the ejector 14 to the predetermined flow rate. As a result, the ejector cycle can be operated at the high efficiency even when the cycle operational condition (e.g., the rpm of the compressor, the external air temperature, the subject cooling space temperature) varies through a wide range.

Furthermore, the function of the ejector 14 is specialized only to the pumping function, so that it is relatively easy to use the fixed nozzle, which has the fixed passage cross sectional area, as the nozzle portion 14a of the ejector 14. The use of the fixed nozzle allows a reduction in the manufacturing costs of the ejector 14.

(Sixth Embodiment)

Figure 9:
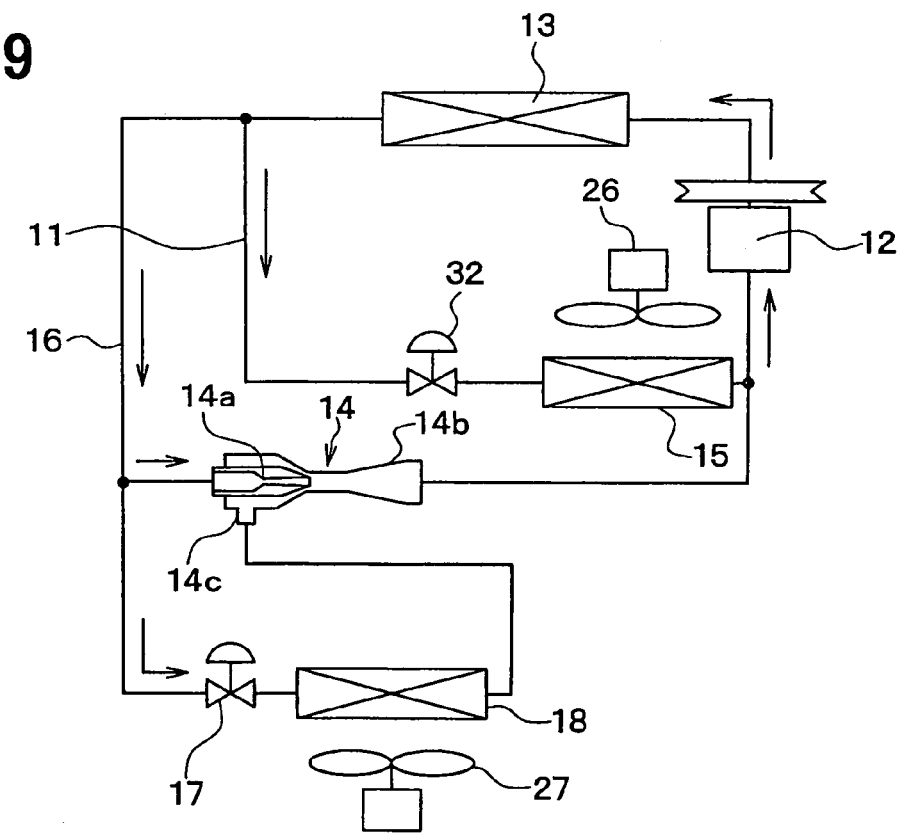
FIG. 9 is a schematic view of an ejector cycle according to a sixth embodiment.

FIG. 9 shows a sixth embodiment, which is a modification of the fifth embodiment. Specifically, in the sixth embodiment, as shown in FIG. 9, the downstream side (the outlet) of the ejector 14 is connected to the downstream side (the outlet) of the first evaporator 15. Even with this modification, the ejector cycle can be operated at the high efficiency due to the appropriate design of the configuration of the ejector 14.

However, in the sixth embodiment, the refrigerant flow (the drive flow), which has passed the nozzle portion 14a of the ejector 14, is directly drawn into the compressor 12 without passing through any evaporator, so that a problem of liquid refrigerant return to the compressor 12 (sometimes referred to as "liquid slugging" of the compressor) possibly occurs.

Therefore, it is preferred to apply the sixth embodiment to the case where the flow rate of the drive flow in the ejector 14 is relatively small, i.e., to the case where the capacity of the second evaporator 18 is small.

In the sixth embodiment, when a thermostatic expansion valve, which controls its valve opening degree in a manner that keeps the superheat of the refrigerant at the downstream side of the ejector 14 at the predetermined value, is used, the liquid refrigerant return from the portion of the refrigerant passage, which is located on the downstream side of the ejector 14, to the compressor 12 can be more reliably limited.

(Seventh Embodiment)

Figure 10:
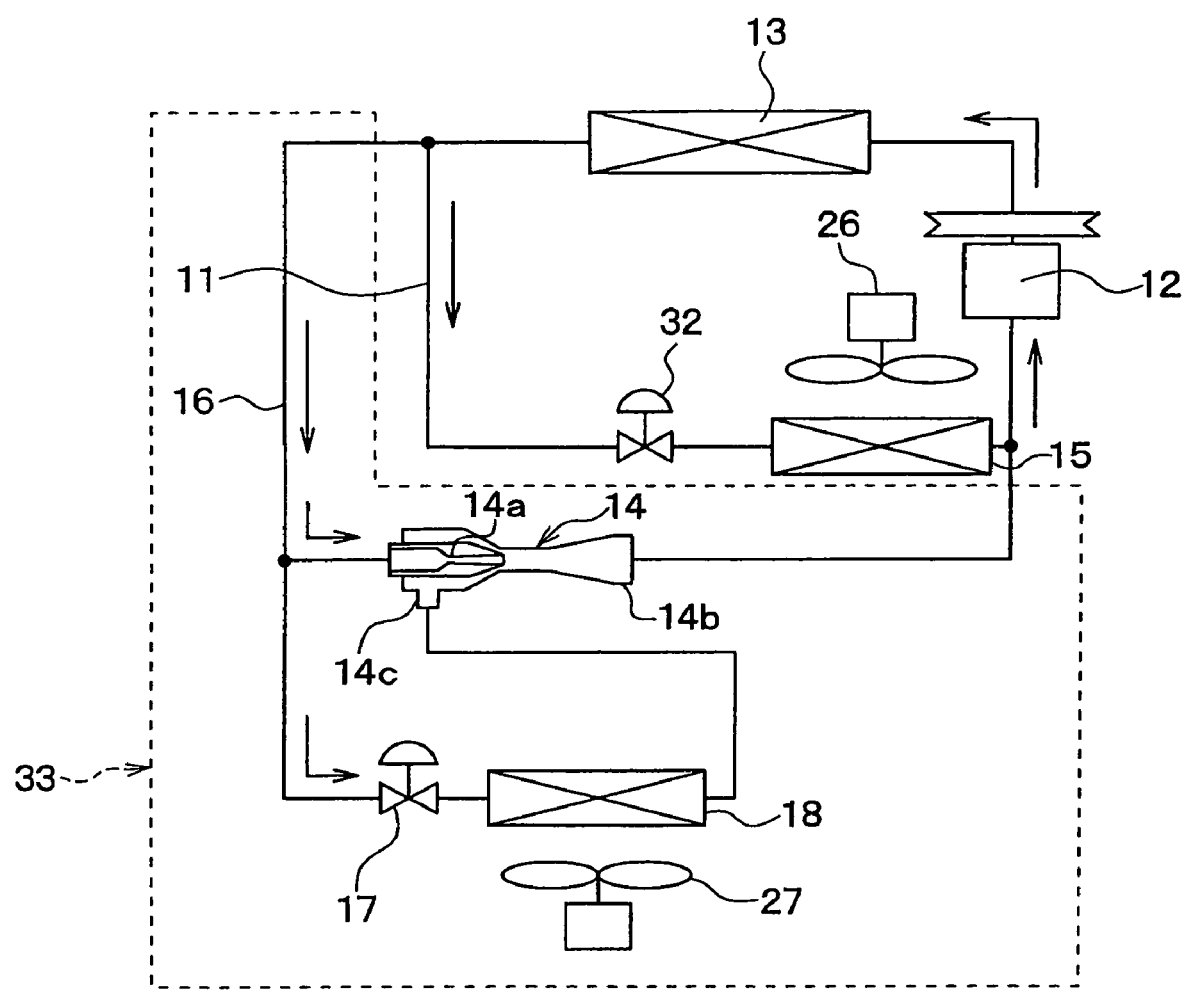
FIG. 10 is a schematic view of an ejector cycle according to a seventh embodiment.

FIG. 10 shows a seventh embodiment, which is a modification of the sixth embodiment. Specifically, in the seventh embodiment, with reference to FIG. 10, the ejector 14, the metering mechanism 17 and the second evaporator 18, which are located within a dotted line frame in the drawing, are pre-assembled as an integral unit 33.

Two pipe lines, which respectively constitute an inlet passage portion of the first branched passage 16 and a downstream side passage portion located downstream of the ejector 14, are provided to the integral unit 33. In this way, the known vapor compression refrigeration cycle, which has the refrigerant circulation passage 11 (including the compressor 12, the radiator 13, the metering mechanism 32 and the first evaporator 15), can be easily modified to the ejector cycle, which includes the two evaporators 15, 18.

Figure 8:
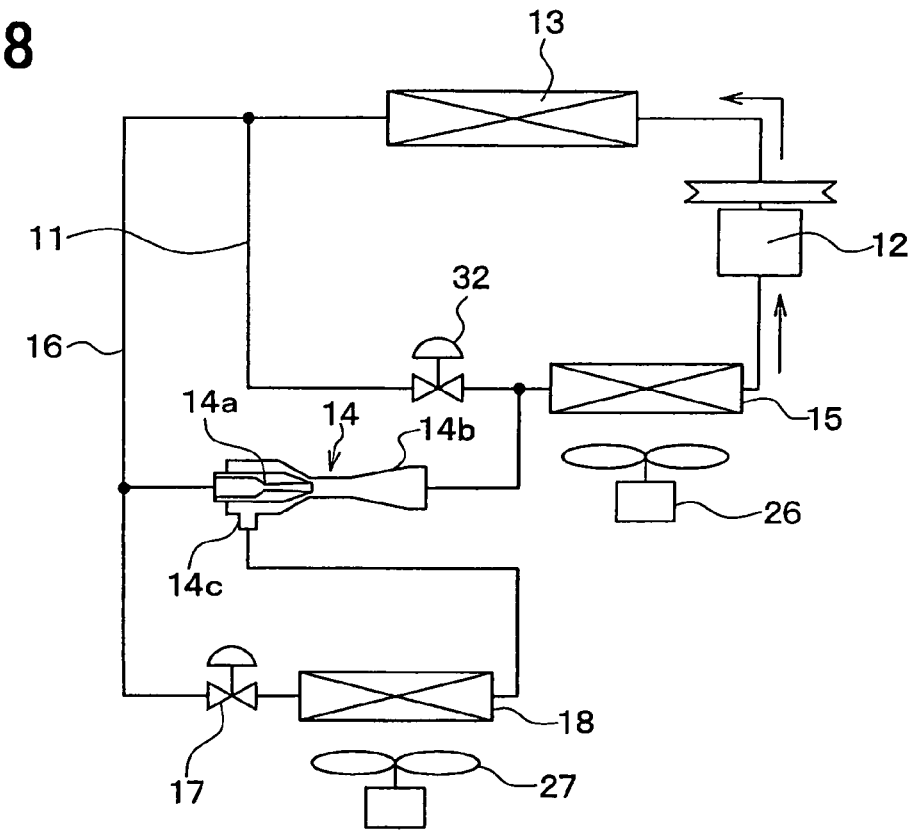
FIG. 8 is a schematic view of an ejector cycle according to a fifth embodiment.

Although the seventh embodiment is the modification of the sixth embodiment, the aspect of the integral unit 33 of the seventh embodiment may be implemented in the fifth embodiment (FIG. 8).

(Eighth to Tenth Embodiments)

In eighth to tenth embodiments, the aspect of the fifth embodiment (FIG. 8) is implemented in the ejector cycle, which has the three evaporators 15, 18, 22.

Figure 11:
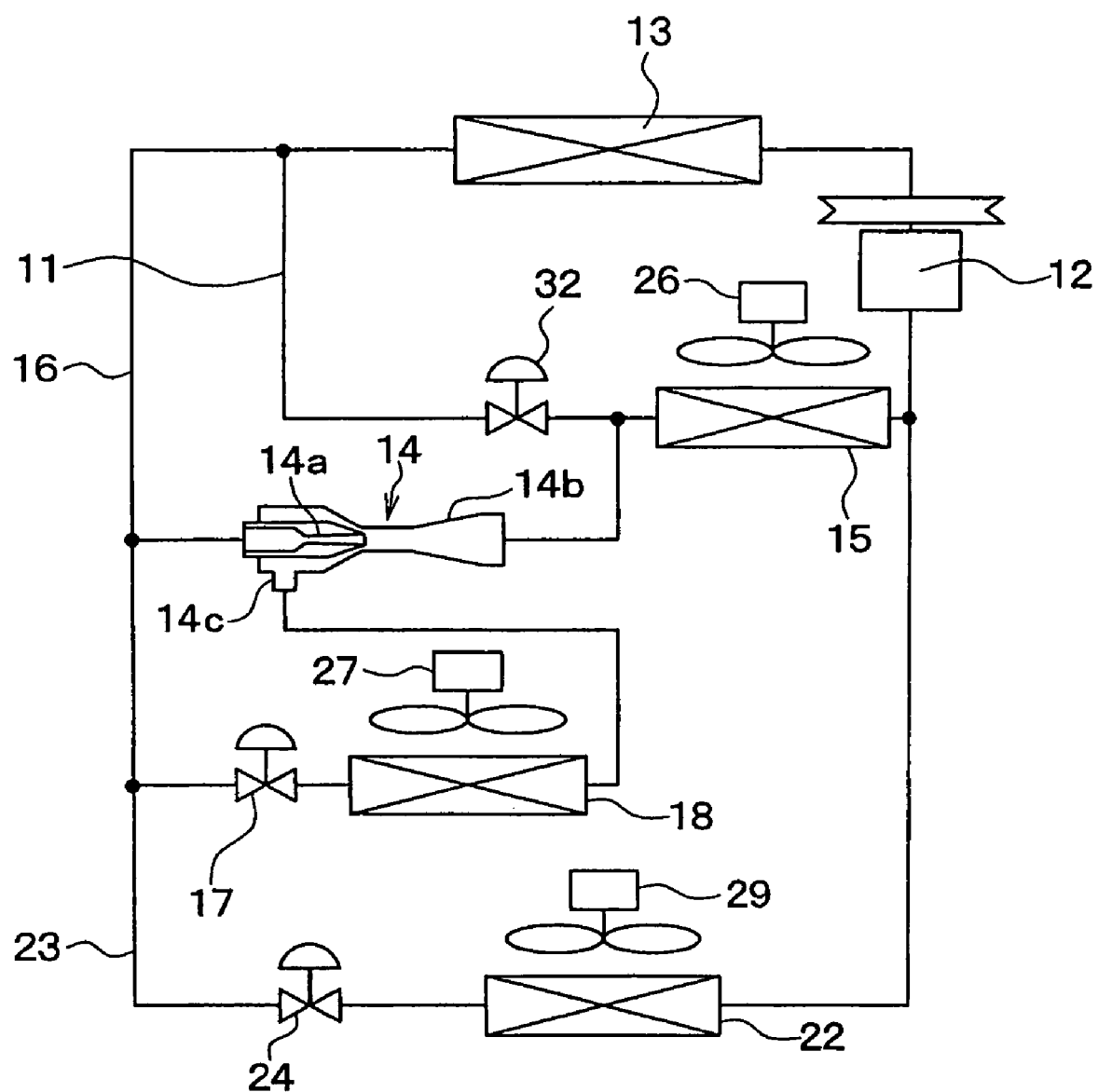
FIG. 11 is a schematic view of an ejector cycle according to an eighth embodiment.

FIG. 11 shows the eighth embodiment, in which the aspect of the fifth embodiment (FIG. 8) is applied to the third embodiment shown in FIG. 5.

Figure 12:
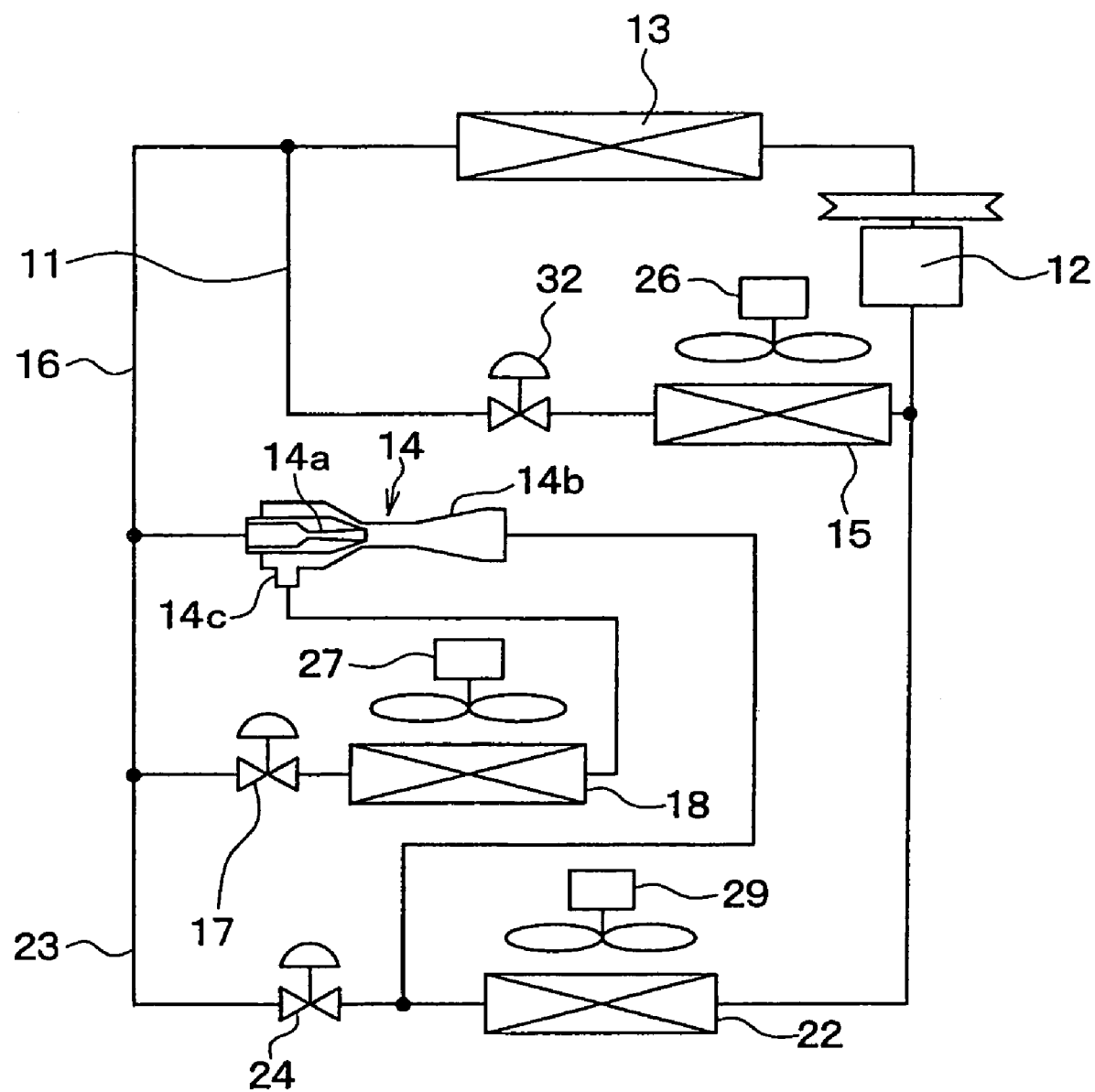
FIG. 12 is a schematic view of an ejector cycle according to a ninth embodiment.

FIG. 12 shows the ninth embodiment, in which the downstream side passage located downstream of the ejector 14 is connected between the downstream side of a metering mechanism (a third metering means) 24 and the upstream side of the third evaporator 22 in the eighth embodiment shown in FIG. 11.

Figure 13:
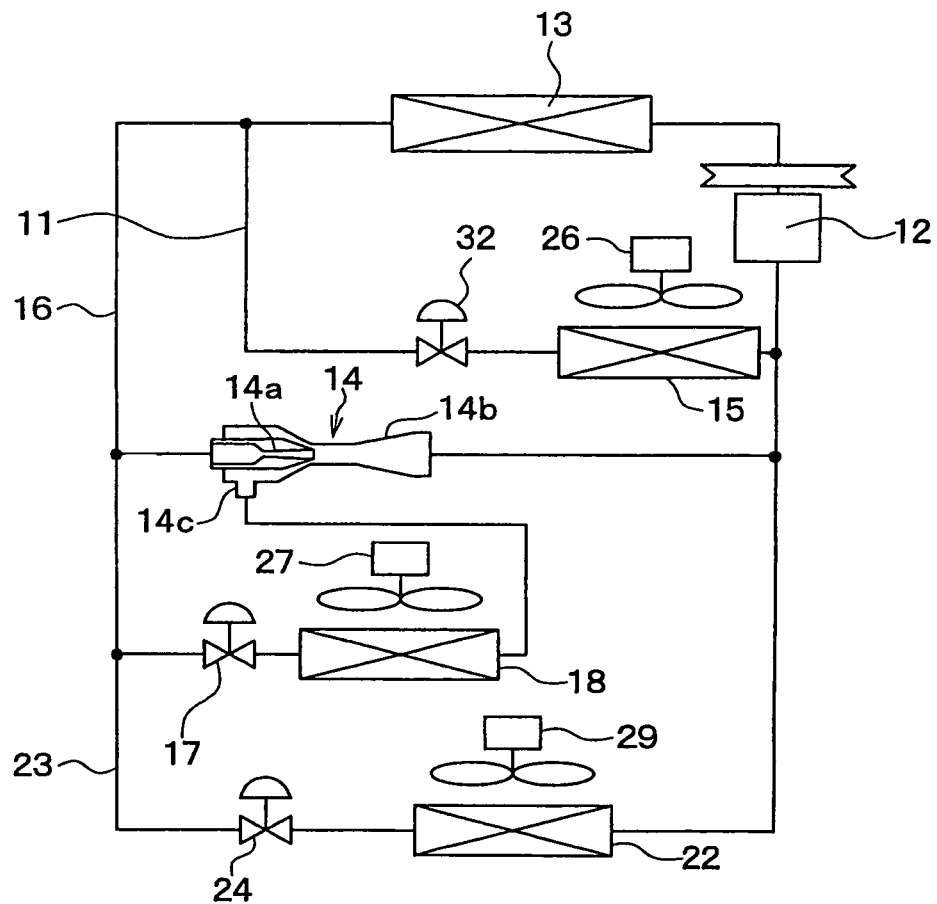
FIG. 13 is a schematic view of an ejector cycle according to a tenth embodiment.

FIG. 13 shows the tenth embodiment, in which the downstream side passage located downstream of the ejector 14 is directly connected to the suction inlet of the compressor 12 in the eight embodiment shown in FIG. 11. The above point is similar to that of the sixth and seventh embodiments shown in FIGS. 9 and 10.

Even in the eighth to tenth embodiments, the refrigerant evaporation pressure (the refrigerant evaporation temperature) of the first evaporator 15 becomes the same as that of the third evaporator 22, and the refrigerant evaporation pressure (the refrigerant evaporation temperature) of the second evaporator 18 becomes smaller than that of the first and the third evaporators 15, 22.

Furthermore, in the eighth to tenth embodiments, the function of the ejector 14 can be specialized to the pumping function, so that the ejector cycle can be operated at the high efficiency upon the appropriate designing of the configuration of the ejector 14.

In any of the first to tenth embodiments, the basic cycle structure is the same as that of the first embodiment, so that the advantages similar to those recited in (1) to (5) in the first embodiment can be achieved.

(Eleventh Embodiment)

Figure 14:
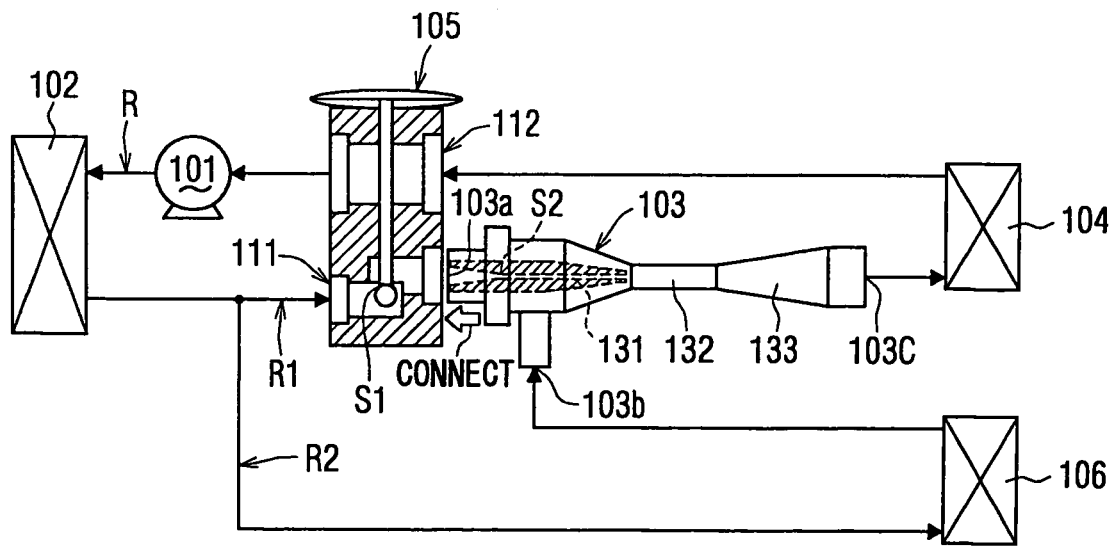
FIG. 14 is a schematic view of an ejector cycle, which includes a refrigeration cycle device, according to a eleventh embodiment of the invention.

An eleventh embodiment will be described with reference to FIGS. 14 to 17B. FIG. 14 schematically shows an ejector cycle, in which a refrigeration cycle device according to the eleventh embodiment of the present invention is implemented and which is suitable for a refrigeration cycle of a vehicle air conditioning system. In the ejector cycle, a refrigerant circulation passage R is provided. A compressor 101 for drawing and compressing refrigerant is arranged in the refrigerant circulation passage R. In the refrigerant circulation passage R, a radiator (a high pressure side heat exchanger) 102 is arranged downstream of the compressor 101. The radiator 102 releases the heat of the high pressure refrigerant, which is discharged from the compressor 101.

The refrigerant, which is discharged from the radiator 102, is supplied to a first refrigerant passage 111 of the refrigeration cycle device of the present embodiment. The refrigeration cycle device of the present embodiment includes a box type thermostatic expansion valve 105 and an ejector 103. More specifically, a refrigerant inlet 103a of the ejector 103 (i.e., a refrigerant inlet 103a of a nozzle portion 131 of the ejector 103) is air-tightly connected to a downstream side of a metering portion S1 of the expansion valve 105, i.e., to an outlet of the first refrigerant passage 111. Since the expansion valve 105 and the ejector 103 are main features of the present embodiment, structures of the expansion valve 105 and of the ejector 103 will be described in greater detail.

In the refrigeration cycle device, a first evaporator 104 is connected to the refrigerant discharge outlet 103c of the ejector 103 on the downstream side of the ejector 103. In the first evaporator 104, the refrigerant, which is discharged from the refrigerant discharge outlet 103c, is evaporated. A refrigerant outlet of the first evaporator 104 is connected to a suction inlet of the compressor 101 through a second refrigerant passage 112 of the refrigeration cycle device. The flow of the refrigerant is divided into two flows at a location (a branching point) between the radiator 102 and the refrigeration cycle device (i.e., the expansion valve 105 and the ejector 103). One of the two divided flows is conducted through a refrigerant circulation passage R1 and is supplied to an inlet of the first refrigerant passage 111 of the refrigeration cycle device. The other one of the two divided flows is conducted through a branched passage R2 and is supplied to a refrigerant suction inlet 103b of the refrigeration cycle device (more specifically, the ejector 103).

Figure 15:
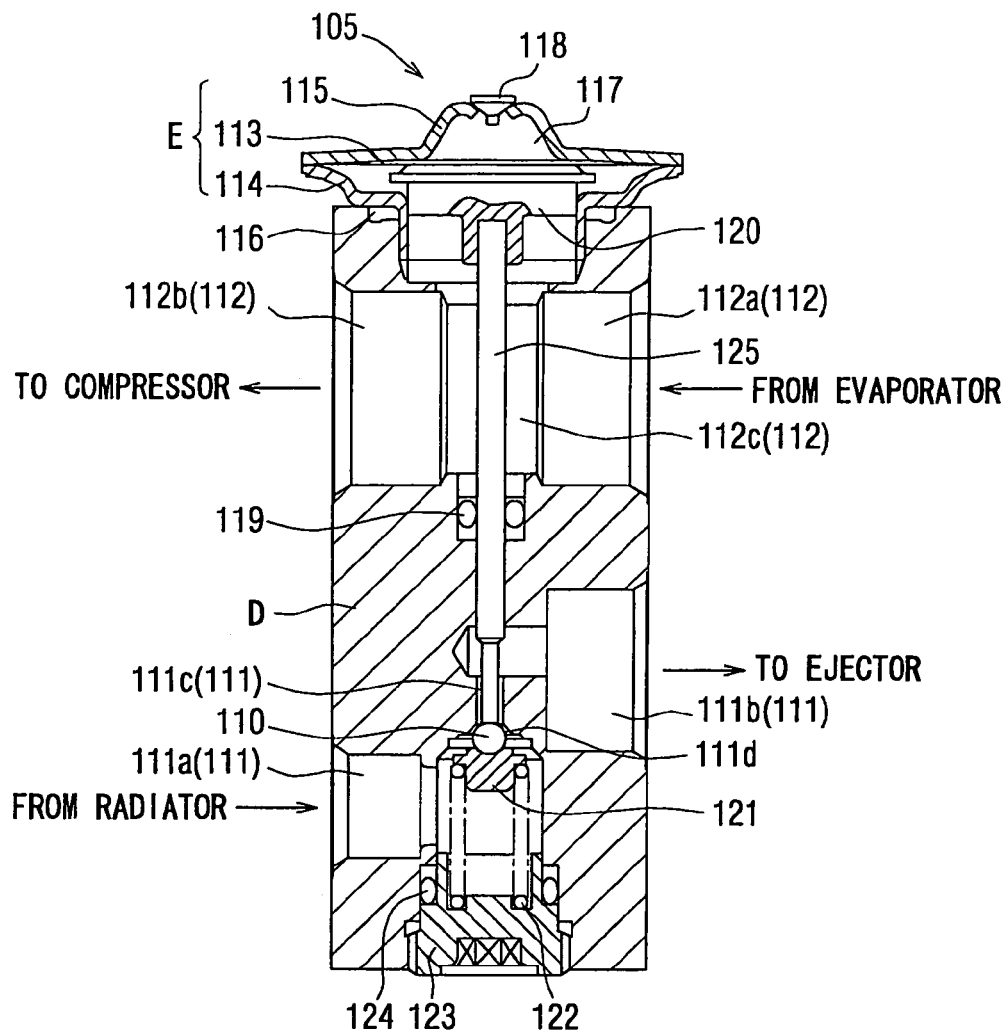
FIG. 15 is a cross sectional view of a box type thermostatic expansion valve according to the eleventh embodiment.

Next, the details of the structures of the expansion valve 105 and of the ejector 103 will be described. FIG. 15 is a cross sectional view of the expansion valve 105 of the present embodiment. The expansion valve 105 is arranged in the refrigerant passage between the radiator 102 and the ejector 103, i.e., is arranged on the upstream side of a nozzle portion 131 of the ejector 103. The expansion valve 105 depressurizes and expands the high pressure refrigerant, which is discharged from the radiator 102, to two-phase refrigerant of a gas and liquid mixture. The expansion valve 105 of the present embodiment has the structure similar to that of a know box type thermostatic expansion valve. A valve opening degree of the expansion valve 105 is controlled to keep the refrigerant superheat in a predetermined range (e.g., 0.1 degrees to 10 degrees) at the refrigerant outlet of the first evaporator 104.

The expansion valve 105 includes a valve block (a valve main body) D, an element arrangement E, a heat conducting portion 120, a conducting rod 125 and a ball valve element 110. The valve block D is made of, for example, aluminum and is formed into a generally rectangular parallelepiped body. Furthermore, the valve block D includes the first refrigerant passage 111 and the second refrigerant passage 112.

The first refrigerant passage 111 includes an inflow port (refrigerant inlet) 111a, an outflow port (refrigerant outlet) 111b and a communication hole 111c. The inflow port 111a is connected to the outlet of the radiator 102. The outflow port 111b is connected to a refrigerant inlet 103a of the ejector 103. The communication hole 111c communicates between the inflow port 111a and the outflow port 111b. A conical valve seat surface 111d is provided to an inlet of the communication hole 111c on the inflow port 111a side of the communication hole 111c. The second refrigerant passage 112 includes an inflow port (refrigerant inlet) 112a, an outflow port (refrigerant outlet) 112b and a communication passage 112c. The inflow port 112a is connected to the outlet of the evaporator 104. The outflow port 112b is connected to the suction inlet of the compressor 101. The communication passage 112c communicates between the inflow port 112a and the outflow port 112b and also communicates with the heat conducting portion 120.

The element arrangement E includes a diaphragm 113, a receiving portion 114 and a cover portion 115. The diaphragm 113 is made of a flexible thin metal plate. The receiving portion 114 holds the diaphragm 113. The element arrangement E is screwed and secured to a top of the valve block D through a packing 116. The receiving portion 114 and the cover portion 115 are connected together by, for example, TIG welding. The diaphragm 113 and the cover portion 115 form a diaphragm chamber 117.

Saturated gas, which is of the same type as the refrigerant gas is used in the refrigeration cycle, is filled in the diaphragm chamber 117. A through hole for filling the saturated gas into the diaphragm chamber 117 penetrates through the cover portion 115. After filling of the saturated gas into the diaphragm chamber 117, a plug 118 is fitted to the through hole of the cover portion 115 to air-tightly close it. Each component (the diaphragm 113, the receiving portion 114, the cover portion 115 and the plug 118) of the element arrangement E is made of a common metal material (e.g., stainless steel), which serves as a first material.

The heat conducting portion 120 is made of a metal material (e.g., aluminum or brass), which serves as a second material and shows a relatively high thermal conductivity that is higher than that of the first material, and is formed into a cylindrical body. An upper surface of the cylindrical body of the heat conducting portion 120 is urged upwardly by an urging force (described later) and is closely engaged with a lower surface of the diaphragm 113. A change in the temperature of the refrigerant (gas phase refrigerant evaporated in the evaporator 104), which flows in the second refrigerant passage 112, is conducted to the diaphragm 113 through the heat conducting portion 120. Furthermore, a lower surface of the cylindrical body of the heat conducting portion 120 is engaged with the conducting rod 125 to conduct displacement of the diaphragm 113 to the ball valve element 110 in cooperation with the conducting rod 125.

The conducting rod 125 is arranged under the heat conducting portion 120 and is slidably held by the valve block D. The conducting rod 125 is engaged with the lower surface of the heat conducting portion 120 at its top end. Furthermore, the conducting rod 125 extends through the second refrigerant passage 112 (the communication passage 112c) in the vertical direction and is inserted in to the communication hole 111c of the first refrigerant passage 111. A lower end of the conducting rod 125 is engaged with a top surface of the ball valve element 110, which is urged against the conical seat surface 111d by a spring 122. In a portion of the valve block D between the first refrigerant passage 111 and the second refrigerant passage 112, an O-ring (a seal portion) 119 is provided to the conducting rod 125, which is vertically slidably received in the valve block D.

As shown in FIG. 15, the ball valve element 110 is provided to the inlet of the communication hole 111c and is held between the conducting rod 125 and a valve receiving member 121. When the ball valve element 110 is seated against the seat surface 111d, the ball valve element 110 closes the communication hole 111c. When the ball valve element 110 is lifted away from the seat surface 111d, the ball valve element 110 opens the communication hole 111c. In FIG. 15, the ball valve element 110 is stationary held in the position where the urging force for downwardly urging the diaphragm 113 (the pressure of the diaphragm chamber 117—the pressure of the refrigerant vapor applied to the lower side of the diaphragm 113) and the load of the spring 122, which urges the ball valve element 110 in the upward direction in FIG. 15 through the valve receiving member 121, are balanced.

The spring 122 is arranged between the valve receiving member 121 and an adjusting screw 123, which is installed to the lower end of the valve block D. The spring 122 urges the ball valve element 110 in the upward direction (the direction for reducing the valve opening degree) in FIG. 15 through the valve receiving member 121. The adjusting screw 123 adjusts the valve opening pressure of the ball valve element 110 (the load of the spring 122 that urges the ball valve element 110) and is threadably engaged with the lower end of the valve block D through an O-ring 124.

Next, operation of the expansion valve 105 will be described. The flow rate of the refrigerant, which passes the communication hole 111c, is determined based on the valve opening degree of the ball valve element 110, i.e., based on the position (the lift amount) of the ball valve element 110 relative to the seat surface 111d. The ball valve element 110 is moved to a balanced position where the pressure of the diaphragm chamber 117, which urges the diaphragm 113 in the downward direction in FIG. 15, the load of the spring 122, which urges the diaphragm 113 in the upward direction in FIG. 15, and the low pressure in the cycle (the pressure of the refrigerant vapor applied to the lower side of the diaphragm 113) are balanced.

When the temperature of the vehicle passenger compartment is increased from the stable state where the vapor pressure is stable, and thereby the refrigerant is rapidly evaporated in the evaporator 104, the temperature (the superheat) of the refrigerant vapor at the outlet of the evaporator 104 is increased. In this way, the change in the temperature of the refrigerant vapor, which flows in the second refrigerant passage 112, is conducted to the sealed gas, which is sealed in the diaphragm chamber 117, through the heat conducting portion 120 and the diaphragm 113. When the temperature of the sealed gas in the diaphragm chamber 117 is increased, the pressure of the diaphragm chamber 117 is increased.

Thus, the diaphragm 113 is urged and is moved in the downward direction in FIG. 15. As a result, the valve opening degree is increased, and the flow rate of the refrigerant supplied to the evaporator 104 is increased. In contrast, when the temperature of the passenger compartment is decreased, and the superheat of the outlet of the evaporator 104 is decreased, the change in the temperature of the refrigerant vapor, which flows in the second refrigerant passage 112, is conducted to the sealed gas of the diaphragm chamber 117. Due to the decrease in the temperature of the sealed gas, the pressure of the diaphragm chamber 117 is decreased.

As a result, when the diaphragm 113 is pushed in the upward direction in FIG. 15, and thereby the ball valve element 110 is moved in the upward direction in FIG. 15, the valve opening degree is decreased. Therefore, the flow rate of the refrigerant, which is supplied to the evaporator 104, is decreased. Therefore, during the normal cycle operation, the valve opening degree is controlled to make the temperature (the superheat) of the refrigerant vapor, for example, about 5 degrees Celsius and thereby to control the flow rate of the refrigerant, which flows in the communication hole 111c.

Figure 16:
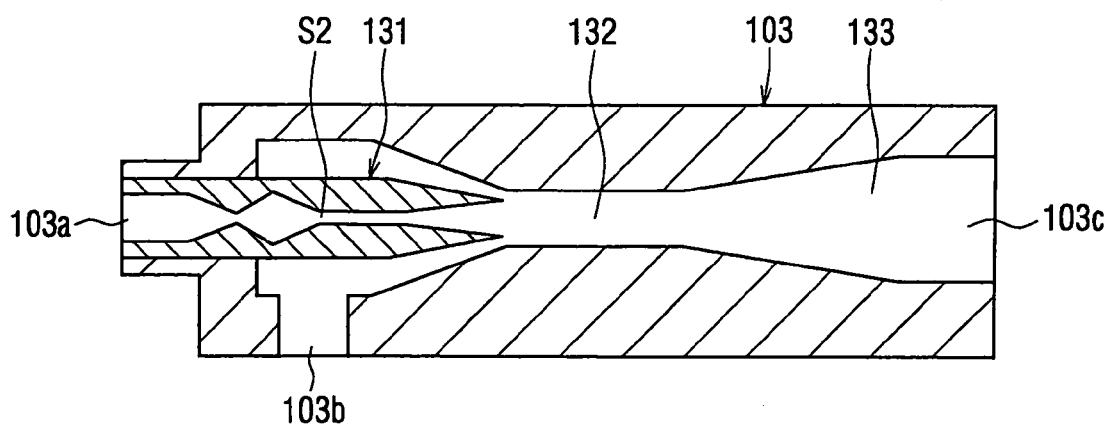
FIG. 16 is a cross sectional view of an ejector according to the eleventh embodiment.
Figure 17A:
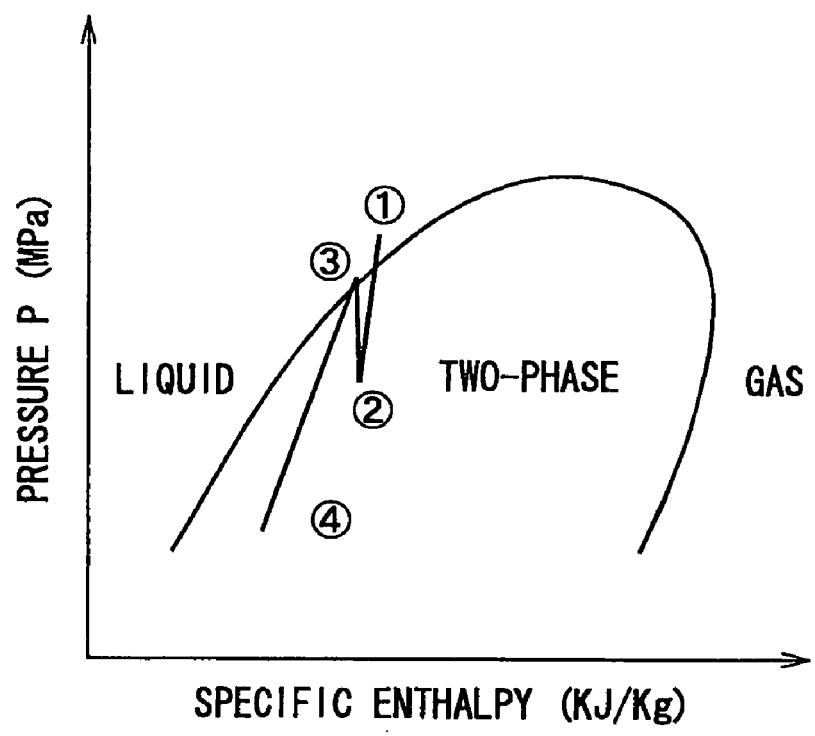
FIG. 17A is a descriptive diagram for describing advantages of the ejector of FIG. 16.
Figure 17B:
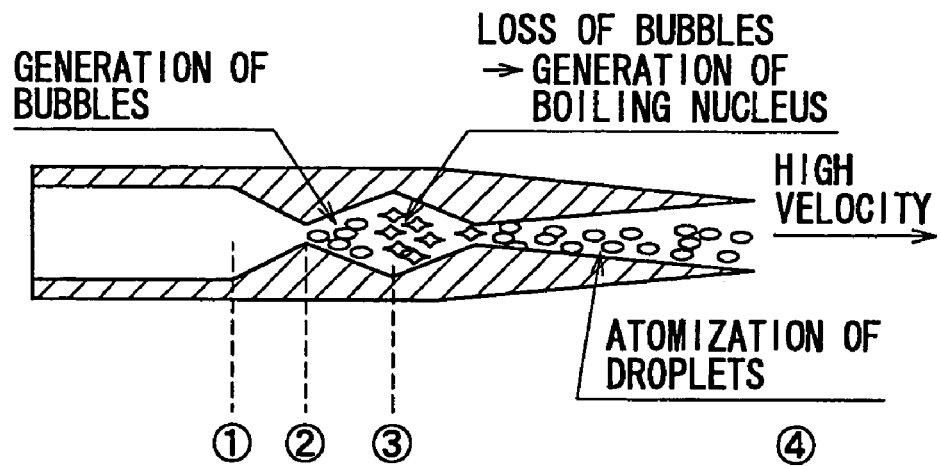
FIG. 17B is a descriptive diagram showing various states of refrigerant in the ejector of FIG. 16.

FIG. 16 is a cross sectional view of the structure of the ejector 103 of the present embodiment, and FIGS. 17A and 17B are descriptive views for describing the advantages of the ejector 103 of FIG. 16. The ejector 103 depressurizes and expands the refrigerant, which is supplied from the radiator 102 through the refrigerant inlet 103a via the first refrigerant passage 111 (the first metering portion S1 in FIG. 14) of the expansion valve 105, so that the ejector 103 draws the gas phase refrigerant, which is evaporated in the second evaporator 106, through the refrigerant suction inlet 103b. Furthermore, the ejector 103 converts the expansion energy of the refrigerant to the pressure energy of the refrigerant and discharges the refrigerant from the refrigerant discharge outlet 103c to increase the suction pressure of the compressor 101.

The ejector 103 includes the nozzle portion 131, the mixing portion 132 and the diffuser portion 133. The nozzle portion 131 isentropically depressurizes and expands the high pressure refrigerant, which is supplied through the refrigerant inlet 103a, by converting the pressure energy of the high pressure refrigerant, which is supplied through the refrigerant inlet 103a, into the velocity energy. Through use of the entraining action of the high velocity refrigerant flow (drive flow), which is discharged from the nozzle portion 131, the mixing portion 132 draws the gas phase refrigerant, which is evaporated in the second evaporator 106, through the suction inlet 103b. Then, the mixing portion 132 mixes the drawn refrigerant, which is drawn from the second evaporator 106, and the discharged refrigerant, which is discharged from the nozzle portion 131. The diffuser portion 133 further mixes the drawn refrigerant, which is drawn from the second evaporator 106, and the discharged refrigerant, which is discharged from the nozzle portion 131. Also, at the same time, the diffuser portion 133 converts the velocity energy of the refrigerant to the pressure energy of the refrigerant to increase the pressure of the refrigerant.

At this time, in the mixing portion 132, the drive flow and the drawn flow are mixed such that the sum of the kinetic energy of the drive flow and kinetic energy of the drawn flow is conserved. Thus, even in the mixing portion 132, the pressure (the static pressure) of the refrigerant is increased. In the diffuser portion 133, the passage cross sectional area is progressively increased to convert the velocity energy (dynamic pressure) of the refrigerant to the pressure energy (static pressure). Thus, in the ejector 103, the refrigerant pressure is increased in both of the mixing portion 132 and the diffuser portion 133. Hereinafter, the mixing portion 132 and the diffuser portion 133 will be collectively referred to as a pressurizing portion.

In the present embodiment, a Laval nozzle, which has a throat (a second metering portion) S2 that has the smallest passage cross sectional area in the Laval nozzle, is used to accelerate the velocity of the refrigerant, which is discharged from the nozzle portion 131, to a sonic velocity or higher velocity. However, it should be understood that a tapered nozzle can be used in place of the Laval nozzle. In the present embodiment, the passage cross sectional area of the mixing portion 132 before the diffuser portion 133 is constant. Alternatively, the passage cross sectional area of the mixing portion 132 can be tapered to have an increasing passage cross sectional area, which increases toward the diffuser portion 133.

The high pressure refrigerant, which is cooled in the radiator 102, is isentropically depressurized to the two-phase refrigerant (mixture of gas and liquid) range. Thereafter, the refrigerant is isentropically depressurized and is expanded by the nozzle portion 131 of the ejector 103 and is supplied to the mixing portion 132 at the sonic velocity or higher velocity. Therefore, the refrigerant is boiled once in the expansion valve 105 and is expanded at the inlet of the nozzle portion 131 to recover the pressure. In this way, the refrigerant can be boiled in the nozzle portion 131 while the boiling nucleus is kept generated. Thus, the boiling of the refrigerant in the nozzle portion 131 is promoted, and the liquid refrigerant droplets are atomized to improve the ejector efficiency $\eta e$ (FIG. 17A).

In the present embodiment, chlorofluorocarbon is used as the refrigerant to keep the high pressure side refrigerant pressure (i.e., the pressure of the refrigerant supplied to the nozzle portion 131) equal to or less than the critical pressure of the refrigerant. Due to the pump action, which utilizes the entraining action of the high velocity refrigerant that is supplied to the mixing portion 132, the refrigerant, which is evaporated in the second evaporator 106, is drawn into the mixing portion 132. Thus, the low pressure side refrigerant is circulated through the second evaporator 106 and the pressurizing portion 132, 133 of the ejector 103 in this order.

In contrast, the refrigerant (the drawn flow), which is drawn from the second evaporator 106, and the refrigerant (the drive flow), which is discharged from the nozzle portion 131, are mixed in the mixing portion 132, and the dynamic pressure of the mixed refrigerant is converted into the static pressure in the diffuser portion 133. Thereafter, the mixed refrigerant is discharged from the diffuser portion 133. Therefore, in the present embodiment, the nozzle efficiency and the ejector efficiency are increased while achieving the sufficient refrigeration capacity, and it is possible to correspond to a wide range of the load change.

In the first evaporator 104, heat is exchanged between the refrigerant and the air to be discharged into the passenger compartment, so that the refrigerant is evaporated upon absorbing the heat. In this way, the cooling capacity is implemented. Furthermore, in the second evaporator 106, heat is exchanged between the refrigerant and the air in the interior of the refrigerator, so that the refrigerant is evaporated upon absorbing the heat. In this way, the cooling capacity is implemented.

Next, operation of the present embodiment will be described with reference to the above structure. When the compressor 101 is operated, the refrigerant is compressed in the compressor 101, so that the high temperature and high pressure refrigerant is discharged from the compressor 101 and is supplied to the radiator 102. In the radiator 102, the high temperature refrigerant releases the heat to the external air, which is external to the vehicle passenger compartment. That is, in the radiator 102, the refrigerant is cooled by the external air and is condensed to the liquid state.

The liquid phase refrigerant, which is outputted from the radiator 102, is divided into the refrigerant circulation passage R1 and the branched passage R2. In the refrigerant circulation passage R1, the refrigerant is supplied from the first refrigerant passage 111 of the refrigeration cycle device to the ejector 103 and is depressurized in the nozzle portion 131. That is, in the nozzle portion 131, the pressure energy of the refrigerant is converted into the velocity energy. The refrigerant, which is discharged from the outlet of the nozzle portion 131 at the high velocity, draws the gas phase refrigerant, which is evaporated in the second evaporator 106, through the suction inlet 103b due to the adiabatic heat drop that occurs at the time of discharging the refrigerant from the nozzle portion 131.

The discharged refrigerant, which is discharged from the nozzle portion 131, and the drawn refrigerant, which is drawn from the second evaporator 106, are mixed, and the mixed refrigerant is supplied to the diffuser portion 133. At this time, the expansion energy of the refrigerant is converted into the pressure energy, so that the pressure of the refrigerant is increased. The refrigerant, which is discharged from the ejector 103, is supplied to the first evaporator 104. In the first evaporator 104, the refrigerant absorbs the heat from the air to be discharged into the vehicle passenger compartment. In other words, in the first evaporator 104, the refrigerant is heated by the interior air of the vehicle passenger compartment and is evaporated.

The evaporated gas phase refrigerant is supplied to the compressor 101 through the second refrigerant passage 112 of the refrigeration cycle device. In the branched passage R2, the other divided refrigerant flow is supplied to the second evaporator 106. In the second evaporator 106, the refrigerant absorbs the heat from the interior air of the refrigerator. In other words, in the second evaporator 106, the refrigerant is heated by the interior air of the refrigerator and is evaporated. The evaporated refrigerant is drawn through the suction inlet 103b of the ejector 103.

Next, the characteristic features and advantages of the present embodiment will be described. The refrigeration cycle device of the present embodiment includes the box type thermostatic expansion valve 105 and the ejector 103. The expansion valve 105 forms the first metering portion S1 to serve as the depressurizing means for depressurizing the high pressure refrigerant. Furthermore, the expansion valve 105 adjusts the flow rate of the refrigerant, which passes the first refrigerant passage 111, based on the superheat of the refrigerant, which passes the first refrigerant passage 111. The ejector 103 includes the nozzle portion 131 and the pressurizing portion 132, 133. The nozzle portion 131 forms the second metering portion S2 and depressurizes and expands the refrigerant by converting the pressure energy of the high pressure refrigerant, which is supplied through the inlet 103a, into the velocity energy. The pressurizing portion 132, 133 draws the gas phase refrigerant from the suction inlet 103b through use of the high velocity refrigerant, which is discharged from the nozzle portion 131. The pressurizing portion 132, 133 converts the velocity energy to the pressure energy while mixing the discharged refrigerant, which is discharged from the nozzle portion 131, and the drawn refrigerant, which is drawn from the suction inlet 103b, so that the pressure of the mixed refrigerant is increased by the pressurizing portion 132, 133. The refrigerant inlet 103a of the ejector 103 is air-tightly connected to the downstream side of the metering portion S1 of the box type thermostatic expansion valve 105.

FIG. 14 is the schematic view of the ejector cycle, which includes the refrigeration cycle device of the eleventh embodiment. With respect to the previously proposed refrigeration cycle, in the ejector cycle of the present embodiment, the ejector 103, which includes the nozzle portion 131 and the pressurizing portion 132, 133, is placed between the expansion valve 105 and the first evaporator 104 and is connected to the expansion valve 105, so that the ejector 103 draws and pressurizes the refrigerant, which is supplied from the second evaporator 106. Therefore, the first and second evaporators 104, 106 are operated at different temperature ranges. At this time, the ejector 103 is easily and detachably connected to the expansion valve 105, so that the variable ejector having the simple structure is provided.

Furthermore, in order to correspond to the load change, the superheat at the outlet of the first evaporator 104 is sensed. At the time of the high load operation, the superheat becomes excessively large, and thereby the expansion valve 105 is opened. In contrast, at the time of the low load operation, the expansion valve 105 is closed. Therefore, the flow rate of the refrigerant is adjusted. Furthermore, the nozzle portion 131 converts the pressure energy to the velocity energy. However, when the two-phase refrigerant of the mixture of the gas and liquid is used, the nozzle efficiency is decreased due to the delay in the boiling of the refrigerant in the second metering portion S2. To address this issue, the boiling nucleus is initially generated in the expansion valve 105 by the depressurization to improve the ejector efficiency (the nozzle efficiency).

Furthermore, a predetermined space is interposed between the first metering portion S1 and the second metering portion S2. In the case where the nozzle efficiency is improved by initially generating the boiling nucleus in the expansion valve 105, the space between the first metering portion S1, which is implemented by the expansion valve 105, and the second metering portion S2, which is implemented by the nozzle throat, contributes to the improved performance. In this way, through the simple assembly of the expansion valve 105 with the ejector 103, and the provision of the predetermined space between the first metering portion S1 and the second metering portion S2, the high ejector efficiency can be achieved.

Furthermore, the expansion valve 105 and the ejector 103 are connected to each other such that the center axis of the expansion valve 105 is perpendicular to the center axis of the ejector 103. In this way, the direction of the suction inlet 103b of the ejector 103 can be freely selected within 360 degrees to provide more freedom at the time of mounting the ejector 103.

Furthermore, the box type expansion valve 105 includes the first refrigerant passage 111, the second refrigerant passage 112, the ball valve element 110, the element arrangement E and the heat conducting portion 120. The first refrigerant passage 111 is connected to the inlet of the first evaporator 104. The second refrigerant passage 112 is connected to the outlet of the first evaporator 104. The ball valve element 110 changes the flow rate of the refrigerant in the first refrigerant passage 111. In the element arrangement E, the diaphragm 113 is held, i.e., is clamped between the receiving portion 114 and the cover portion 115, and the saturated gas is sealed in the diaphragm chamber 117 between the diaphragm 113 and the cover portion 115. Furthermore, the diaphragm 113, the receiving portion 114 and the cover portion 115 are made of the common material. The element arrangement E is detachably connected to the valve block D. The heat conducting portion 120 is made of the different material, which shows the thermal conductivity that is higher than that of the element arrangement E. The heat conducting portion 120 conducts the temperature change of the refrigerant, which flows in the second refrigerant passage 112, to the diaphragm 113. Furthermore, the heat conducting portion 120 conducts the displacement of the diaphragm 113 to the ball valve element 110. The flow rate of the refrigerant, which flows in the first refrigerant passage 111, is adjusted based on the displacement of the ball valve element 10.

The above structure is of the previously proposed box type expansion valve 105. With the above structure, through the combination of the previously proposed devices, the manufacturing costs can be minimized. Furthermore, variations of the above structure can be implemented at the relatively low costs by appropriately combining the previously proposed devices.

Furthermore, the above vapor compression type refrigeration cycle, which transfers the heat of the lower temperature side to the higher temperature side, includes the compressor 101, the radiator 102, the refrigeration cycle device 103, 105, the first evaporator 104, the branched passage R2 and the second evaporator 106. The compressor 101 compresses the refrigerant. The radiator 102 releases the heat from the high pressure refrigerant, which is discharged from the compressor 101. The refrigeration cycle device supplies the refrigerant, which is outputted from the radiator 102, to the first refrigerant passage 111. The outlet of the first evaporator 104 is connected to the suction inlet of the compressor 101 through the second refrigerant passage 112. The first evaporator 104 evaporates the refrigerant, which is discharged from the outlet 103c of the refrigeration cycle device. The branched passage R2 branches the refrigerant flow at the point (branching point) between the radiator 102 and the refrigeration cycle device and conducts it to the suction inlet 103b. The second evaporator 106 is arranged in the branched passage R2 and evaporates the refrigerant.

With the above structure, the ejector 103 is easily detachable relative to the expansion valve 105. Thus, the ejector cycle can be made with the simple structure. Furthermore, in the case where the second evaporator 106 is not used, the simple normal expansion valve cycle can be made by simply removing the ejector 103 and the second evaporator 106.

Furthermore, in the above embodiment, the refrigerant can be one of the chlorofluorocarbon refrigerant, hydrocarbon (HC) refrigerant and the carbon dioxide refrigerant. The chlorofluorocarbon is a general name of an organic compound, which is made from carbon, fluorine, chlorine and hydrogen. The chlorofluorocarbon has been widely used as the refrigerant. The chlorofluorocarbon refrigerant includes hydrochlorofluorocarbon (HCFC) refrigerant, hydrofluorocarbon (HFC) refrigerant and the like and is called as the alternative for chlorofluorocarbon, which is used to limit damage of the ozone shield.

The HC refrigerant is the natural refrigerant material, which includes hydrogen and carbon. Examples of the HC refrigerant include R600a (isobutene) and R290 (propane). Accordingly, any one of the chlorofluorocarbon refrigerant, the hydrocarbon refrigerant and the carbon dioxide refrigerant can be used as the refrigerant of the present embodiment.

(Twelfth Embodiment)

Figure 18A:
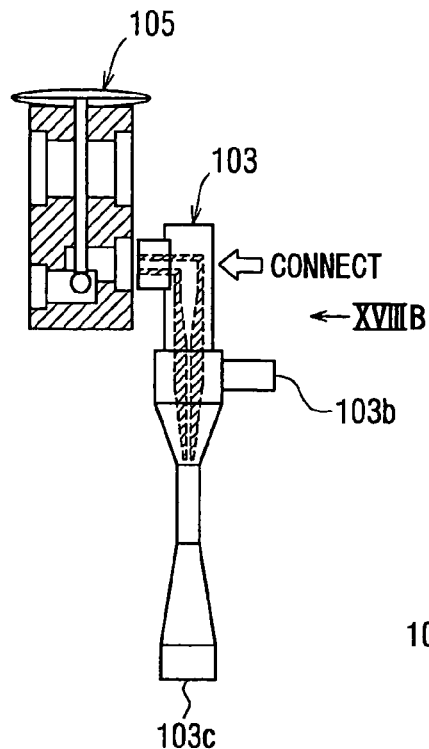
FIG. 18A is a partial cross sectional view of a refrigeration cycle device according to a twelfth embodiment of the present invention.
Figure 18B:
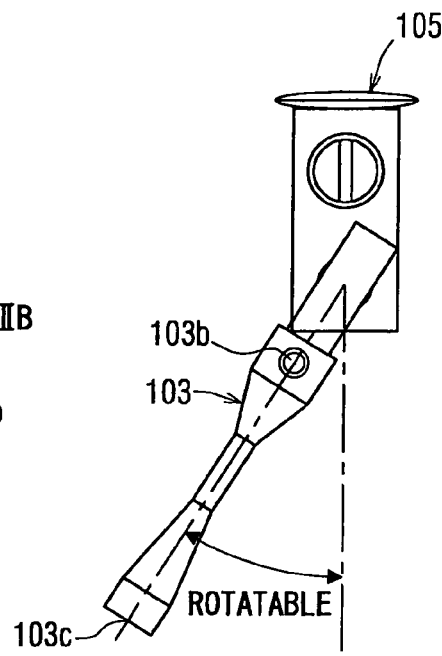
FIG. 18B is a view seen in a direction of XVIIIB in FIG. 18A.
Figure 19:
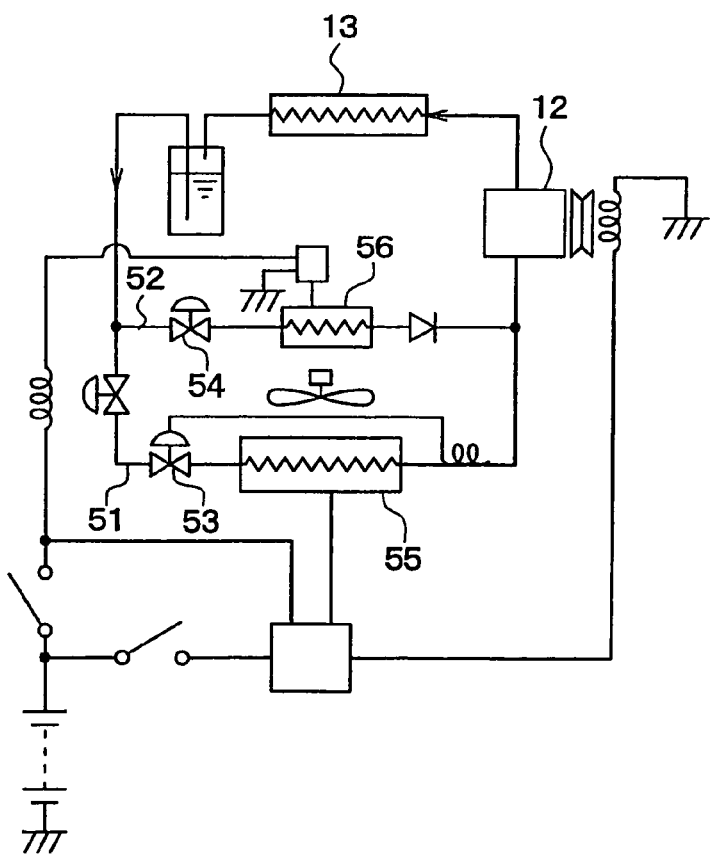
FIG. 19 is a schematic view of a prior art refrigeration cycle.

FIG. 18A is a partial cross sectional view of a refrigeration cycle device according to a twelfth embodiment of the present invention, and FIG. 18B is a view seen in a direction of XVIIIB in FIG. 18A. In the eleventh embodiment, the expansion valve 105 and the ejector 103 are connected to each other such that the center axis of the expansion valve 105 is perpendicular to the center axis of the ejector 103. In the twelfth embodiment, the expansion valve 105 and the ejector 103 are connected to each other such that the center axis of the expansion valve 105 is parallel to the center axis of the ejector 103. In this way, the direction of the refrigerant discharge outlet 103c of the ejector 103 can be freely selected within 360 degrees to provide more freedom at the time of mounting the ejector 103.

Other Embodiments

The present invention is not limited the above embodiments, and thus the above embodiments can be modified as follows.

(1) In the first embodiment, the present invention is implemented in the vehicle air conditioning and refrigerating system. Alternatively, both the first evaporator 15, which has the higher refrigerant evaporation temperature, and the second evaporator 18, which has the lower refrigerant evaporation temperature, can be used to cool different regions (e.g., the vehicle front seat side region and the vehicle rear seat side region) of the vehicle passenger compartment.

(2) In the first embodiment, both the first evaporator 15, which has the higher refrigerant evaporation temperature, and the second evaporator 18, which has the lower refrigerant temperature, can be used to cool the interior of the refrigerator. More specifically, the first evaporator 15, which has the higher refrigerant evaporation temperature, can be used to cool the interior of the chillroom of the refrigerator, and the second evaporator 18, which has the lower refrigerant evaporation temperature, can be used to cool the interior of the freezing room of the refrigerator.

(3) The ejector cycle of the present invention can be applied to a vapor compression cycle, such as a heat pump of a water heater.

(4) Although the type of the refrigerant is no specified in the first to tenth embodiments, the refrigerant can be any suitable refrigerant, such as, chlorofluorocarbon, hydrocarbon (HC) alternatives for chlorofluorocarbon, carbon dioxide, which is applicable to both a supercritical vapor compression cycle and a sub-critical vapor compression cycle.

(5) In the first embodiment, the gas-liquid separator is not used. Alternatively, the gas-liquid separator may be provided on the upstream side of the first evaporator 15 to provide only the liquid phase refrigerant to the first evaporator 15. Further alternatively, the gas-liquid separator may be provided to the upstream side of the compressor 12 to provide only the gas phase refrigerant to the compressor 12. Furthermore, a receiver may be provided on the downstream side of the radiator 13. The receiver separates the liquid phase refrigerant from the gas phase refrigerant and supplies only the liquid phase refrigerant to its downstream side.

(6) In the first to fourth embodiments, the first flow rate control valve 17 is provided on the upstream side of the second evaporator 18. In a case where a change in the thermal load of the second evaporator 18 is relatively small, a fixed metering device, such as a capillary tube, which has an aperture of a fixed size, can be used as the first flow rate control valve 17.

Furthermore, when the fixed metering device and the solenoid valve are integrated together as the first flow rate control valve 17, it is possible to provide a metering mechanism, in which the flow rate control function of the fixed metering device and the flow passage closing (shutting off) function are combined.

Furthermore, the first flow rate control valve 17 can be a metering device (e.g., an expansion valve), which has a mechanism to control an opening degree of its aperture based on the sensed superheat at the outlet of the evaporator.

Furthermore, in the second and third embodiments, the first flow rate control valve 17 is separated from the second solenoid valve 20, and the second flow rate control valve 24 is separated from the third solenoid valve 28. Alternatively, in place of the combination of the first flow rate control valve 17 and the second solenoid valve 20 and/or the combination of the second flow rate control valve 24 and the third solenoid valve 28, a metering valve(s) with the flow passage closing (shutting off) function, in which the flow rate control valve and the solenoid valve are integrated, can be used.

(7) In the first to fourth embodiments, the variable displacement compressor is used as the compressor 12, and the volume of the variable displacement compressor 12 is controlled by the ECU 25 to control the refrigerant discharge rate. Alternatively, a fixed displacement compressor may be used as the compressor 12. In such a case, on- and off-operations of the fixed displacement compressor 12 are controlled by an electromagnetic clutch, and a ratio of an on-operation time period and an off-operation time period of the compressor 12 is controlled to control the refrigerant discharge rate of the compressor 12.

Furthermore, in a case where an electric compressor is used, the refrigerant discharge rate of the electric compressor 12 can be controlled by controlling the rpm of the electric compressor 12.

(8) In the first to tenth embodiments, if the ejector 14 is a flow rate variable ejector, in which a cross sectional area of the refrigerant flow passage of the nozzle portion 14a is variable based on the sensed superheat at the outlet of the first evaporator 15, the discharged refrigerant pressure (the flow rate of the refrigerant to be drawn into the ejector 14) can be controlled.

Thus, in each of the multiple evaporator operating modes of the second embodiment, the first and second evaporator operating mode and the first to third evaporator operating mode of the third embodiment, the flow rate of the refrigerant, which flows through the second evaporator 18, can be more precisely controlled.

(9) In the first to tenth embodiments, the multiple evaporators (e.g., the first and second evaporators 15, 18) can be integrally assembled as a single unit.

(10) In the eleventh and twelfth embodiments, the present invention is implemented in the vehicle air conditioning system. However, the present invention is not limited to the vehicle air conditioning system. For example, the present invention can be implemented in any other vapor compression type cycle, such as a heat pump cycle of a water heater. Furthermore, in the eleventh and twelfth embodiments, the first and second evaporators 104, 106 have the two different refrigeration capacities, respectively. Alternatively, three or more evaporators can be provided to have three or more different refrigeration capacities.

Furthermore, a receiver can be arranged downstream of the radiator 102 in the eleventh and twelfth embodiments. Also, a fixed ejector, in which the second metering portion S2 of the nozzle portion 131 is stationary, may be used in place of the ejector 103 of the eleventh and twelfth embodiments. Furthermore, in the eleventh and twelfth embodiments, the two evaporators 104, 106 of different refrigeration capacities are separately constructed. Alternatively, these evaporators 104, 106 can be formed integrally.

Additional advantages and modifications will readily occur to those skilled in the art. The invention in its broader terms is therefore not limited to the specific details, representative apparatus, and illustrative examples shown and described. Furthermore, it should be noted that the feature(s) of one of the above-described embodiments or modification(s) can be combined with the feature(s) of any other one of the above-described embodiments or modification(s).

What is claimed is:

1. An ejector cycle comprising:
  a compressor that draws and compresses refrigerant;
  a radiator that radiates heat from the compressed high pressure refrigerant discharged from the compressor;
  an ejector that includes:
    a nozzle portion, which depressurizes and expands the refrigerant on a downstream side of the radiator;
    a gas phase refrigerant suction inlet, from which gas phase refrigerant is drawn by action of a flow of the high velocity refrigerant discharged from the nozzle portion; and
    a pressurizing portion that converts a velocity energy of a flow of a mixture of the high velocity refrigerant and the gas phase refrigerant into a pressure energy;
  a first evaporator that evaporates the refrigerant, which is outputted from the ejector, to achieve a refrigeration capacity, wherein a refrigerant outlet of the first evaporator is connected to a suction inlet of the compressor;
  a first branched passage that branches a flow of the refrigerant at a corresponding branching point located between the radiator and the ejector, wherein the first branched passage conducts the branched flow of the refrigerant to the gas phase refrigerant suction inlet of the ejector;
  a first metering means that depressurizes the refrigerant on a downstream side of the radiator; and a second evaporator that is arranged in the first branched passage, wherein the second evaporator evaporates the refrigerant to achieve a refrigeration capacity.

2. The ejector cycle according to claim 1, wherein:
the first metering means is arranged in the first branched passage; and
the second evaporator is arranged in the first branched passage on a downstream side of the first metering means.

3. The ejector cycle according to claim 2, further comprising:
a first opening and closing means that opens and closes to conduct and shut off, respectively, a flow of the refrigerant to the ejector; and
a second opening and closing means that opens and closes to conduct and shut off, respectively, a flow of the refrigerant to the second evaporator, wherein the second opening and closing means is arranged in the first branched passage.

4. The ejector cycle according to claim 3, further comprising a control means for controlling a refrigerant discharge capacity of the compressor, for controlling an opening degree of the first metering means and for controlling opening and closing of each of the first and second opening and closing means, wherein:
the control means selectively performs one of:
a first evaporator operating mode, at which the refrigerant is supplied to the first evaporator while stopping supply of the refrigerant to the second evaporator;
a second evaporator operating mode, at which the refrigerant is supplied to the second evaporator while stopping supply of the refrigerant to the first evaporator; and
a multiple evaporator operating mode, at which the refrigerant is simultaneously supplied to the first and second evaporators, and at which the refrigeration capacity of the first evaporator is controlled by controlling the refrigerant discharge capacity of the compressor, and at which the refrigeration capacity of the second evaporator is controlled by controlling the opening degree of the first metering means.

5. The ejector cycle according to claim 4, wherein:
the ejector is of a flow rate variable type, in which a flow rate of the refrigerant that passes through the ejector is changed by a flow rate variable mechanism controlled by the control means; and
the control means controls the refrigeration capacity of the second evaporator in the multiple evaporator operating mode by controlling the flow rate variable mechanism.

6. The ejector cycle according to claim 2, further comprising:
a second branched passage that branches a flow of the refrigerant at a corresponding branching point of the first branched passage located upstream of the first metering means and conducts the branched flow of the refrigerant to a corresponding merging point located between the refrigerant outlet of the first evaporator and the suction inlet of the compressor;
a second metering means that is arranged in the second branched passage and depressurizes the refrigerant; and
a third evaporator that is arranged in the second branched passage on a downstream side of the second metering means, wherein the third evaporator evaporates the refrigerant to achieve a refrigeration capacity.

7. The ejector cycle according to claim 3, further comprising:
a second branched passage that branches a flow of the refrigerant at a corresponding branching point of the first branched passage located upstream of the first metering means and conducts the branched flow of the refrigerant to a merging point located between the refrigerant outlet of the first evaporator and the suction inlet of the compressor;
a second metering means that is arranged in the second branched passage and depressurizes the refrigerant;
a third evaporator that is arranged in the second branched passage on a downstream side of the second metering means, wherein the third evaporator evaporates the refrigerant to achieve a refrigeration capacity; and
a third opening and closing means that is arranged in the second branched passage, wherein the third opening and closing means opens and closes to conduct and shut off, respectively, a flow of the refrigerant to the third evaporator.

8. The ejector cycle according to claim 7, further comprising a control means for controlling a refrigerant discharge capacity of the compressor, for controlling opening degrees of the first and second metering means and for controlling opening and closing of each of the first to third opening and closing means, wherein:
the control means selectively performs one of:
a first evaporator operating mode, at which the refrigerant is supplied to the first evaporator while stopping supply of the refrigerant to the second and third evaporators;
a second evaporator operating mode, at which the refrigerant is supplied to the second evaporator while stopping supply of the refrigerant to the first and third evaporators;
a third evaporator operating mode, at which the refrigerant is supplied to the third evaporator while stopping supply of the refrigerant to the first and second evaporators; and
a multiple evaporator operating mode, at which the refrigerant is simultaneously supplied to a predetermined set of evaporators selected from the first to third evaporators.

9. The ejector cycle according to claim 8, wherein the multiple evaporator operating mode is selected from at least one of:
a first and second evaporator operating mode, at which the refrigerant is simultaneously supplied to the first and second evaporators while stopping supply of the refrigerant to the third evaporator, and at which the refrigeration capacity of the first evaporator is controlled by controlling the refrigerant discharge capacity of the compressor, and at which the refrigeration capacity of the second evaporator is controlled by controlling the opening degree of the first metering means;
a first and third evaporator operating mode, at which the refrigerant is simultaneously supplied to the first and third evaporators while stopping supply of the refrigerant to the second evaporator, and at which the refrigeration capacity of the first evaporator is controlled by controlling the refrigerant discharge capacity of the compressor, and at which the refrigeration capacity of the third evaporator is controlled by controlling the opening degree of the second metering means;
a second and third evaporator operating mode, at which the refrigerant is simultaneously supplied to the second and third evaporators while stopping supply of the refrigerant to the first evaporator, and at which the refrigeration capacity of the second evaporator is controlled by controlling the refrigerant discharge capacity of the compressor and the opening degree of the first metering means, and at which the refrigeration capacity of the third evaporator is controlled by controlling the refrigerant discharge capacity of the compressor and the opening degree of the second metering means; and a first to third evaporator operating modes, at which the refrigerant is simultaneously supplied to the first to third evaporators, at which the refrigeration capacity of the first evaporator is controlled by controlling the refrigerant discharge capacity of the compressor, and at which the refrigeration capacity of the second evaporator is controlled by controlling the opening degree of the first metering means, and at which the refrigeration capacity of the third evaporator is controlled by controlling the opening degree of the second metering means.

10. The ejector cycle according to claim 9, wherein:

the ejector is of a flow rate variable type, in which a flow rate of the refrigerant that passes through the ejector is changed by a flow rate variable mechanism controlled by the control means; and the control means controls the refrigeration capacity of the second evaporator in one of the first and second evaporator operating mode and the first to third evaporation operating mode by controlling the flow rate variable mechanism.

11. The ejector cycle according to claim 2, further comprising:

a third branched passage that branches a flow of the refrigerant at a corresponding branching point located between the ejector and the first evaporator and conducts the branched flow of the refrigerant to a corresponding merging point located between the refrigerant outlet of the first evaporator and the suction inlet of the compressor; and a fourth evaporator that is arranged in the third branched passage and evaporates the refrigerant to achieve a refrigeration capacity.

12. The ejector cycle according to claim 1, wherein a refrigerant evaporation pressure of the second evaporator is lower than that of the first evaporator.

13. The ejector cycle according to claim 6, wherein:

a refrigerant evaporation pressure of the second evaporator is lower than that of the first evaporator; and a refrigerant evaporation pressure of the third evaporator is the same as that of the first evaporator.

14. The ejector cycle according to claim 1, wherein:

the compressor is a variable displacement compressor; and a refrigerant discharge capacity of the variable displacement compressor is adjusted by changing a displacement of the variable displacement compressor.

15. The ejector cycle according to claim 1, wherein:

the compressor is a fixed displacement compressor; and a refrigerant discharge capacity of the fixed displacement compressor is adjusted by controlling a ratio of an on-operation time period and an off-operation time period.

16. The ejector cycle according to claim 1, wherein the refrigerant is one of chlorofluorocarbon refrigerant, hydrocarbon refrigerant and carbon dioxide refrigerant.

17. The ejector cycle according to claim 1, wherein:

the metering means is a box type thermostatic expansion valve, which includes:

a first refrigerant passage that is arranged between a refrigerant outlet of the radiator and a refrigerant inlet of the nozzle portion of the ejector, wherein a refrigerant outlet of the first refrigerant passage is directly joined to the refrigerant inlet of the nozzle portion of the ejector;

a second refrigerant passage that is arranged between a refrigerant outlet of the first evaporator and the suction inlet of the compressor; and a first metering portion that is arranged in the first refrigerant passage and depressurizes the refrigerant;

the first metering portion adjusts a flow rate of the refrigerant in the first refrigerant passage according to a superheat of the refrigerant that passes through the second refrigerant passage; and the nozzle portion of the ejector forms a second metering portion.

18. The ejector cycle according to claim 17, wherein a predetermined space is interposed between the first metering portion and the second metering portion.

19. The ejector cycle according to claim 17, wherein a center axis of the box type thermostatic expansion valve is perpendicular to a center axis of the ejector.

20. The ejector cycle according to claim 17, wherein a center axis of the box type thermostatic expansion valve is parallel to a center axis of the ejector.

21. The ejector cycle according to claim 17, wherein the first metering portion includes a valve element;

the box type thermostatic expansion valve further includes:

a valve main body, in which the first and second refrigerant flow passages are formed;

an element arrangement, which is detachably installed to the valve main body and includes:

a receiving portion;

a diaphragm that is held in the receiving portion; and a cover portion that covers the receiving portion to clamp the diaphragm between the receiving portion and the cover portion and to form a diaphragm chamber between the diaphragm and the cover portion, wherein saturated gas is sealed in the diaphragm chamber, and the diaphragm, the receiving portion and the cover portion are made of a first material; and a heat conducting portion that is made of a second material, which has a thermal conductivity higher than that of the first material, wherein the heat conducting portion conducts a temperature change of the refrigerant, which flows in the second refrigerant passage, to the diaphragm, and the heat conducting portion conducts a displacement of the diaphragm to the valve element; and the flow rate of the refrigerant, which flows through the first refrigerant passage is adjusted according to a displacement amount of the valve element.

22. The ejector cycle according to claim 1, wherein the first evaporator and the second evaporator are integrally assembled as a single unit.

23. An ejector cycle comprising:

a compressor that draws and compresses refrigerant;

a radiator that radiates heat from the compressed high pressure refrigerant discharged from the compressor;

a first metering means that depressurizes the refrigerant on a downstream side of the radiator;

a first evaporator that is connected between a refrigerant outlet of the first metering means and a suction inlet of the compressor, wherein the first evaporator evaporates the low pressure refrigerant, which is outputted at least from the first metering means, to achieve a refrigeration capacity;

an ejector that includes:
- a nozzle portion, which depressurizes and expands the refrigerant on a downstream side of the radiator;
- a gas phase refrigerant suction inlet, from which gas phase refrigerant is drawn by action of a flow of the high velocity refrigerant discharged from the nozzle portion; and
- a pressurizing portion that converts a velocity energy of a flow of a mixture of the high velocity refrigerant and the gas phase refrigerant into a pressure energy;

a first branched passage that branches a flow of the refrigerant at a corresponding branching point located between the radiator and the first metering means, wherein the first branched passage conducts the branched flow of the refrigerant to the gas phase refrigerant suction inlet of the ejector;

a second metering means that is arranged in the first branched passage and depressurizes the refrigerant on a downstream side of the radiator; and a second evaporator that is arranged in the first branched passage on a downstream side of the second metering means, wherein the second evaporator evaporates the refrigerant to achieve a refrigeration capacity.

24. The ejector cycle according to claim 23, further comprising:
a second branched passage that branches a flow of the refrigerant at a corresponding branching point of the first branched passage located upstream of the second metering means and conducts the branched flow of the refrigerant to a corresponding merging point located between a refrigerant outlet of the first evaporator and the suction inlet of the compressor;
a third metering means that is arranged in the second branched passage and depressurizes the refrigerant; and
a third evaporator that is arranged in the second branched passage on a downstream side of the third metering means, wherein the third evaporator evaporates the refrigerant to achieve a refrigeration capacity.

25. The ejector cycle according to claim 23, wherein a refrigerant outlet of the ejector is connected between a refrigerant outlet of the first metering means and a refrigerant inlet of the first evaporator.

26. The ejector cycle according to claim 23, wherein a refrigerant outlet of the ejector is connected between a refrigerant outlet of the first evaporator and a refrigerant inlet of the compressor.

27. The ejector cycle according to claim 24, wherein a refrigerant outlet of the ejector is connected between a refrigerant outlet of the third metering means and a refrigerant inlet of the third evaporator.

28. The ejector cycle according to claim 23, wherein:
the ejector, the first branched passage, the second metering means and the second evaporator are preassembled as a integral unit;
the compressor, the radiator, the first metering means and the first evaporator constitute a refrigerant circulation passage; and
the integral unit is connected to the circulation passage.

29. The ejector cycle according to claim 23, wherein a refrigerant evaporation pressure of the second evaporator is lower than that of the first evaporator.

30. The ejector cycle according to claim 24, wherein:
a refrigerant evaporation pressure of the second evaporator is lower than that of the first evaporator; and
a refrigerant evaporation pressure of the third evaporator is the same as that of the first evaporator.

31. The ejector cycle according to claim 23, wherein:
the compressor is a variable displacement compressor; and
a refrigerant discharge capacity of the variable displacement compressor is adjusted by changing a displacement of the variable displacement compressor.

32. The ejector cycle according to claim 23, wherein:
the compressor is a fixed displacement compressor; and
a refrigerant discharge capacity of the fixed displacement compressor is adjusted by controlling a ratio of an on-operation time period and an off-operation time period.

33. The ejector cycle according to claim 23, wherein the refrigerant is one of chlorofluorocarbon refrigerant, hydrocarbon refrigerant and carbon dioxide refrigerant.

34. The ejector cycle according to claim 23, wherein the first evaporator and the second evaporator are integrally assembled as a single unit.

* * * * *